(12) United States Patent
Jeon et al.

(10) Patent No.: US 12,167,348 B2
(45) Date of Patent: Dec. 10, 2024

(54) ELECTRONIC DEVICE CONTROLLING TRANSMISSION POWER OF SIGNAL AND METHOD FOR OPERATING THE SAME

(71) Applicant: Samsung Electronics Co., Ltd., Suwon-si (KR)

(72) Inventors: Jaewoong Jeon, Suwon-si (KR); Hyunkee Min, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 344 days.

(21) Appl. No.: 17/858,624

(22) Filed: Jul. 6, 2022

(65) Prior Publication Data

US 2023/0027625 A1  Jan. 26, 2023

Related U.S. Application Data

(63) Continuation of application No. PCT/KR2022/008538, filed on Jun. 16, 2022.

(30) Foreign Application Priority Data

Jul. 8, 2021 (KR) .................. 10-2021-0089553

(51) Int. Cl.
*H04B 7/00* (2006.01)
*H04W 52/34* (2009.01)
*H04W 52/38* (2009.01)

(52) U.S. Cl.
CPC ........... *H04W 52/38* (2013.01); *H04W 52/34* (2013.01)

(58) Field of Classification Search
CPC ... H04W 52/38; H04W 52/34; H04W 52/322; H04W 52/327; H04W 52/0203; H04W 52/0209

See application file for complete search history.

(56) References Cited

U.S. PATENT DOCUMENTS 11,412,456 B2 * 8/2022 Dinan ................. H04W 52/365
11,496,972 B2 * 11/2022 Guo ..................... H04W 52/50
(Continued)

FOREIGN PATENT DOCUMENTS

| CN | 109495120 A | 3/2019 |
|----|-------------|--------|
| CN | 111970024 A | 11/2020 |

(Continued)

OTHER PUBLICATIONS

International Search Report and written opinion dated Sep. 21, 2022, issued in International Application No. PCT/KR2022/008538.

*Primary Examiner* — Tuan Pham
(74) *Attorney, Agent, or Firm* — Jefferson IP Law, LLP

(57) ABSTRACT

An electronic device including a first communication circuit supporting a first radio access technology (RAT), a first processor operatively connected with the first communication circuit, a second communication circuit supporting a second RAT, and a second processor electrically connected with the first processor and the second communication circuit is provided. The second processor provides first data to the first processor, obtains first information indicating a first frequency band from the first processor, and transmits the first information to the second communication circuit to control an upper limit of transmission power of a second signal through a second frequency band into a magnitude associated with the first frequency band.

20 Claims, 26 Drawing Sheets

(56) References Cited

U.S. PATENT DOCUMENTS

| | | |
|---|---|---|
| 2006/0034228 A1 | 2/2006 | Kim et al. |
| 2008/0102874 A1 | 5/2008 | Gautier et al. |
| 2009/0275355 A1 | 11/2009 | Tan et al. |
| 2015/0110048 A1 | 4/2015 | Damnjanovic et al. |
| 2016/0087877 A1 | 3/2016 | Ryu et al. |
| 2017/0223698 A1 | 8/2017 | Nui et al. |
| 2019/0013881 A1* | 1/2019 | Olesen ................... H04B 15/02 |
| 2020/0267665 A1 | 8/2020 | Wei et al. |
| 2020/0275383 A1 | 8/2020 | Yang et al. |
| 2020/0336996 A1 | 10/2020 | Van et al. |
| 2021/0029644 A1 | 1/2021 | Cho et al. |
| 2021/0084642 A1 | 3/2021 | Kim et al. |
| 2021/0219240 A1 | 7/2021 | Lee et al. |
| 2021/0219242 A1 | 7/2021 | Dinan |
| 2021/0314876 A1 | 10/2021 | Zhao et al. |

FOREIGN PATENT DOCUMENTS

| | | |
|---|---|---|
| KR | 10-2006-0007882 A | 1/2006 |
| KR | 10-2016-0072161 A | 6/2016 |
| KR | 10-2017-0044674 A | 4/2017 |
| KR | 10-2017-0057278 A | 5/2017 |
| KR | 10-2020-0084158 A | 7/2020 |
| KR | 10-2020-0104017 A | 9/2020 |
| KR | 10-2020-0122887 A | 10/2020 |
| KR | 10-2021-0011169 A | 2/2021 |
| WO | 2019/125021 A1 | 6/2019 |

* cited by examiner

ELECTRONIC DEVICE CONTROLLING TRANSMISSION POWER OF SIGNAL AND METHOD FOR OPERATING THE SAME

CROSS-REFERENCE TO RELATED APPLICATION(S)

This application is a continuation application, claiming priority under § 365(c), of an International application No. PCT/KR2022/008538, filed on Jun. 16, 2022, which is based on and claims the benefit of a Korean patent application number 10-2021-0089553, filed on Jul. 8, 2021, in the Korean Intellectual Property Office, the disclosure of which is incorporated by reference herein in its entirety.

TECHNICAL FIELD

The disclosure relates to an electronic device controlling the transmission power of a signal and a method for operating the same.

BACKGROUND ART

As mobile communication technology evolves, multi-functional portable terminals are commonplace and, to meet increasing demand for radio traffic, vigorous efforts are underway to develop fifth generation (5G) communication systems. To achieve a higher data transmission rate, 5G communication systems are being implemented on higher frequency bands (e.g., a band of 25 GHz to 60 GHz) as well as those used for third generation (3G) communication systems and long-term evolution (LTE) communication systems.

To implement 5G communication, stand-alone (SA) and non-stand alone (NSA) schemes are taken into consideration. Of the two, the NSA scheme may include an LTE new radio (NR)-dual connectivity scheme that uses the new radio (NR) system along with the legacy LTE system. In the NSA scheme, user equipment (UE) may use not only evolved Node Bs (eNBs) of the LTE system but also next generation Node Bs (gNBs) of the NR system. Technology allowing UEs to use heterogeneous communication systems may be termed dual connectivity.

Dual connectivity has been first proposed in 3rd generation partnership project (3GPP) release-12 where the 3.5 GHz frequency band other than that for LTE system is used for small cells. For dual connectivity proposed in 3GPP release-12 in the 5G EN-DC scheme, it is under discussion to use LTE network communication as a master node and NR network communication as a secondary node.

Meanwhile, to transmit a signal from an electronic device to a communication network (e.g., a base station), data generated from a processor or a communication processor in the electronic device may be signal-processed through a radio frequency integrated circuit (RFIC) and radio frequency front-end (RFFE) for convenience of description) circuit and then transmitted to the outside of the electronic device through at antenna.

An electronic device may transmit a reference signal (e.g., a sounding reference signal (SRS)) referenced for channel estimation by a base station in the communication network, through the RFFE to at least one antenna. The base station may perform multi-antenna signal processing or beamforming processing by estimating the channel based on the reference signal transmitted from the electronic device. The electronic device may enhance data reception performance by receiving a multi-antenna signal-processed or beamformed signal from the base station.

The above information is presented as background information only to assist with an understanding of the disclosure. No determination has been made, and no assertion is made, as to whether any of the above might be applicable as prior art with regard to the disclosure.

DISCLOSURE

Technical Problem

User equipment (UE) may be implemented to meet a predetermined standard when radiating signals according to heterogeneous radio access technologies (RATs). For example, the predetermined standard, which is a standard required by the federal communications commission (FCC), may mean that the total sum of the specific absorption rates when signals are individually radiated from the heterogeneous radio access technologies (RATs) is less than a designated value (e.g., 1.6 W/Kg) and may require that the total emission ratio (TER) be less than 1 if the heterogeneous RATs include a RAT using a band of 6 GHz or more.

Accordingly, the UE may be implemented to back off the transmission power of a signal of a specific RAT when signals are radiated using heterogeneous RATs so that the UE meets the above-described standard. Meanwhile, a Tx antenna (or transmission antenna) may be allocated for each frequency band used for each of the heterogeneous RATs, and such Tx antennas are deployed in several portions of the UE, with some disposed adjacent to each other, and others spaced apart far away from each other. Thus, if the UE fails to meet the SAR and the TER according to the above-described standard but meets the SAR peak to location (SPLS) ratio reflecting the distances between the Tx antennas considering the distances between the Tx antennas, the UE is regarded as meeting the standard. However, in the case of backing off the transmission power of a signal of a specific RAT in the context where signals are radiated using heterogeneous RATs as described above, without considering the inter-Tx antennas and the frequency bands used by the Tx antennas, back-off may be performed even in a situation where they are arranged at a distance so that it is not required to back off the transmission power of the Tx antennas, causing deterioration of communication performance.

Aspects of the disclosure are to address at least the above-mentioned problems and/or disadvantages and to provide at least the advantages described below. Accordingly, an aspect of the disclosure is to provide an electronic device and a method for operating the same may enable back-off to be performed in an appropriate context requiring back-off when heterogeneous RATs are used, thereby preventing degradation of communication performance.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a first communication circuit supporting a first RAT, a first processor operatively connected with the first communication circuit, a second communication circuit supporting a second RAT, and a second processor electrically connected with the first processor and the second communication circuit, wherein the second processor is configured to provide first data to the first processor, wherein a first signal, corresponding to the first data based on the first RAT is transmitted through a first frequency band using the first processor and the first communication circuit, provide second data to the second communication circuit, wherein a second signal, corresponding to the second data based on the second RAT is transmitted through a second frequency band using the second communication circuit, obtain first information indicating the first frequency band from the first processor, and transfer the first information to the second communication circuit for the second communication circuit to control an upper limit of transmission power of the second signal through the second frequency band into a magnitude associated with the first frequency band.

In accordance with another aspect of the disclosure, a method for operating an electronic device is provided. The method includes providing first data to a first processor operatively connected with a first communication circuit supporting a first RAT (NR), using a second processor, wherein a first signal, corresponding to the first data based on the first RAT, is transmitted through a first frequency band using the first processor and the first communication circuit, providing second data to a second communication circuit supporting a second RAT, using the second processor, wherein a second signal, corresponding to the second data based on the second RAT, is transmitted through a second frequency band using the second communication circuit, obtaining first information indicating the first frequency band from the first processor, using the second processor, and transferring the first information to the second communication circuit, using the second processor, for the second communication circuit to control an upper limit of transmission power of the second signal through the second frequency band into a magnitude associated with the first frequency band.

In accordance with another aspect of the disclosure, an electronic device is provided. The electronic device includes a first communication circuit supporting a first RAT (NR), a plurality of first antennas operatively connected with the first communication circuit, a first processor operatively connected with the first communication circuit, a second communication circuit supporting a second RAT, a plurality of second antennas operatively connected with the second communication circuit, and a second processor electrically connected with the first processor and the second communication circuit, wherein the second processor is configured to provide first data to the first processor, wherein a first signal, corresponding to the first data based on the first RAT, is transmitted through a third antenna among the plurality of first antennas using the first processor and the first communication circuit, provide second data to the second communication circuit, wherein a second signal, corresponding to the second data based on the second RAT, is transmitted through a fourth antenna among the plurality of second antennas using the second communication circuit, a position of the third antenna and a position of the fourth antenna meeting a designated condition, obtain first information indicating a first frequency band associated with the third antenna from the first processor, and transfer the first information to the second communication circuit for the second communication circuit to control an upper limit of transmission power of the second signal through the second frequency band into a magnitude associated with the first frequency band.

Embodiments of the disclosure are not limited to the foregoing objectives, and other objectives would readily be appreciated by a skilled artisan from the following detailed description taken in conjunction with the accompanying drawings.

Advantageous Effects

According to various embodiments, there may be provided an electronic device and a method for operating the same, which may receive information about a frequency band of a specific RAT when heterogeneous RATs are used from a processor supporting the specific RAT and transfer it to the communication circuit of another RAT so as to perform a back-off operation on the transmission power of the signal of the other RAT corresponding to the frequency band of the specific RAT. Therefore, it is possible to provide an electronic device and a method for operating the same, which enable back-off to be performed in required appropriate contexts, thereby preventing degradation of communication performance.

Other aspects, advantages, and salient features of the disclosure will become apparent to those skilled in the art from the following detailed description, which, taken in conjunction with the annexed drawings, discloses various embodiments of the disclosure.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
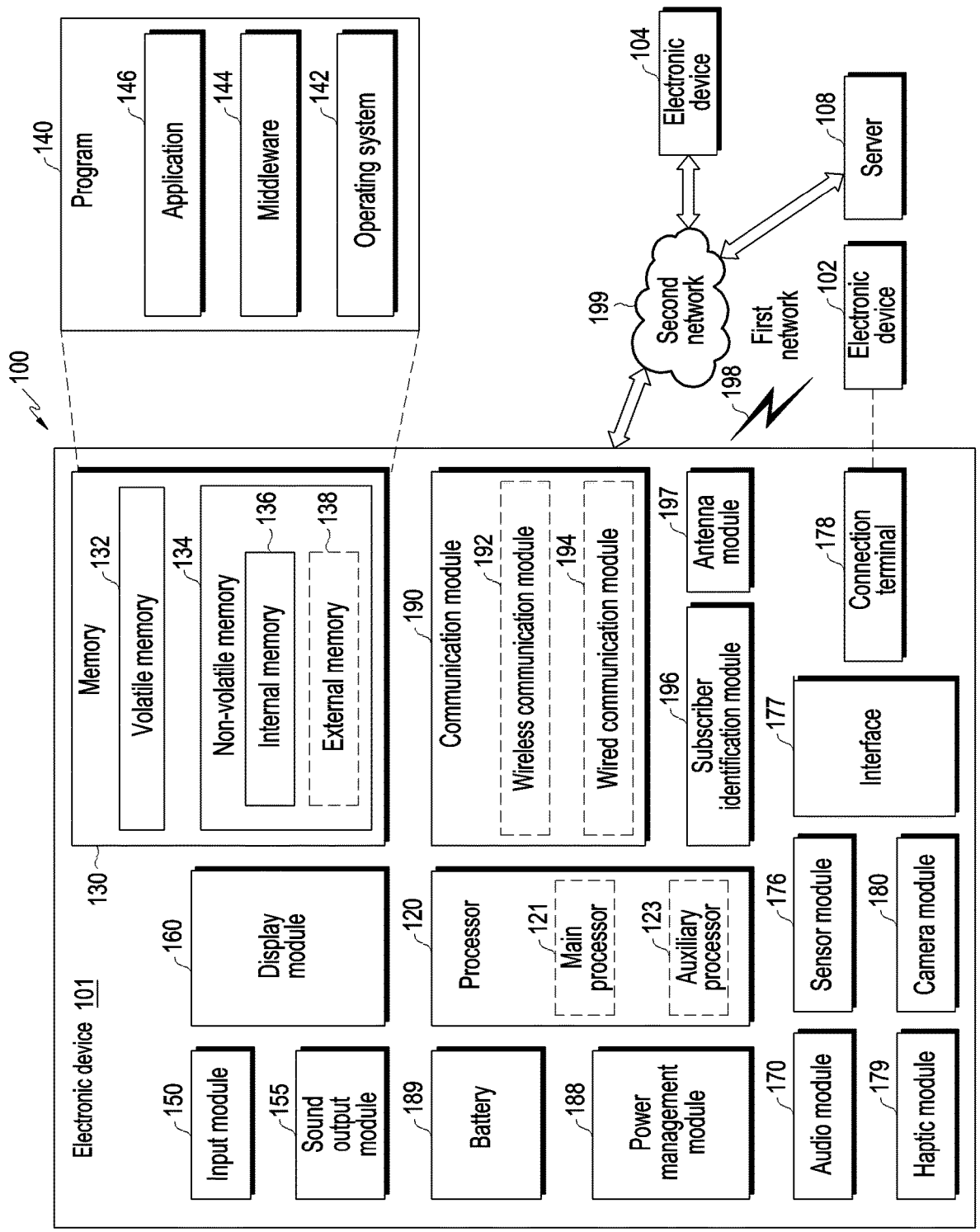
FIG. 1 is a view illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, (e.g., corresponding to a selected NR frequency band) may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
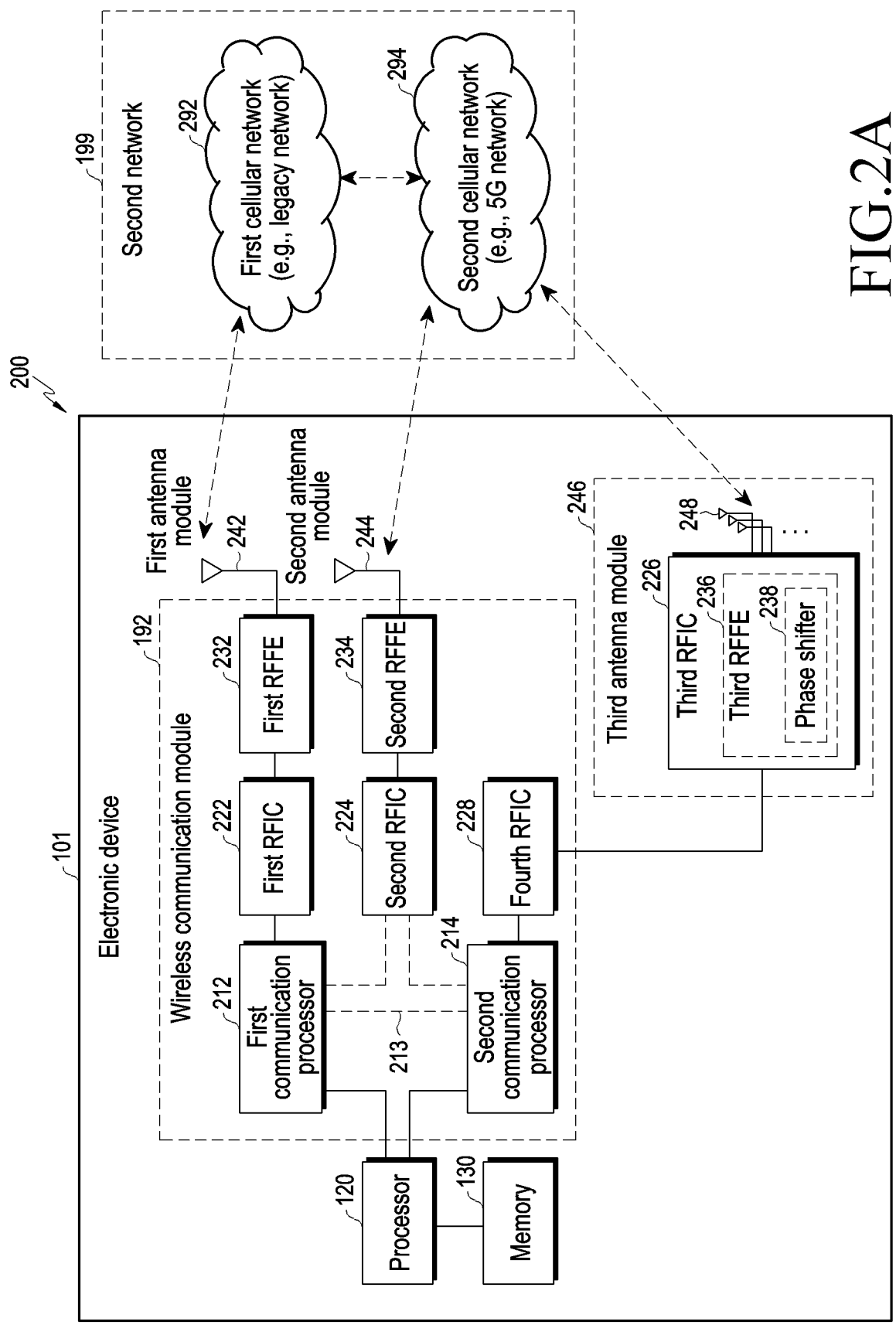
FIG. 2A is a view illustrating an example of an electronic device according to an embodiment of the disclosure.
Figure 2B:
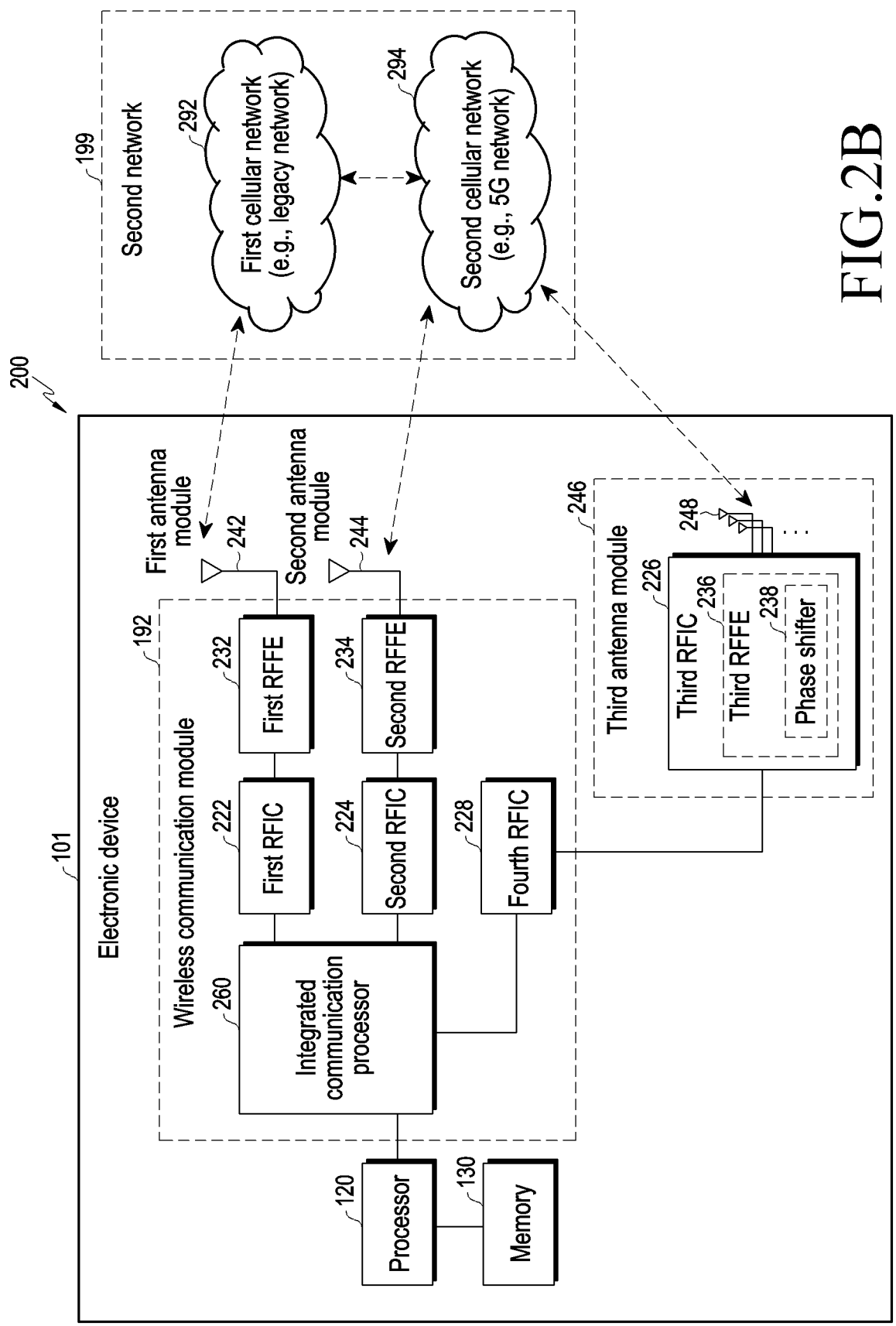
FIG. 2B is a view illustrating another example of an electronic device according to an embodiment of the disclosure.
Figure 2C:
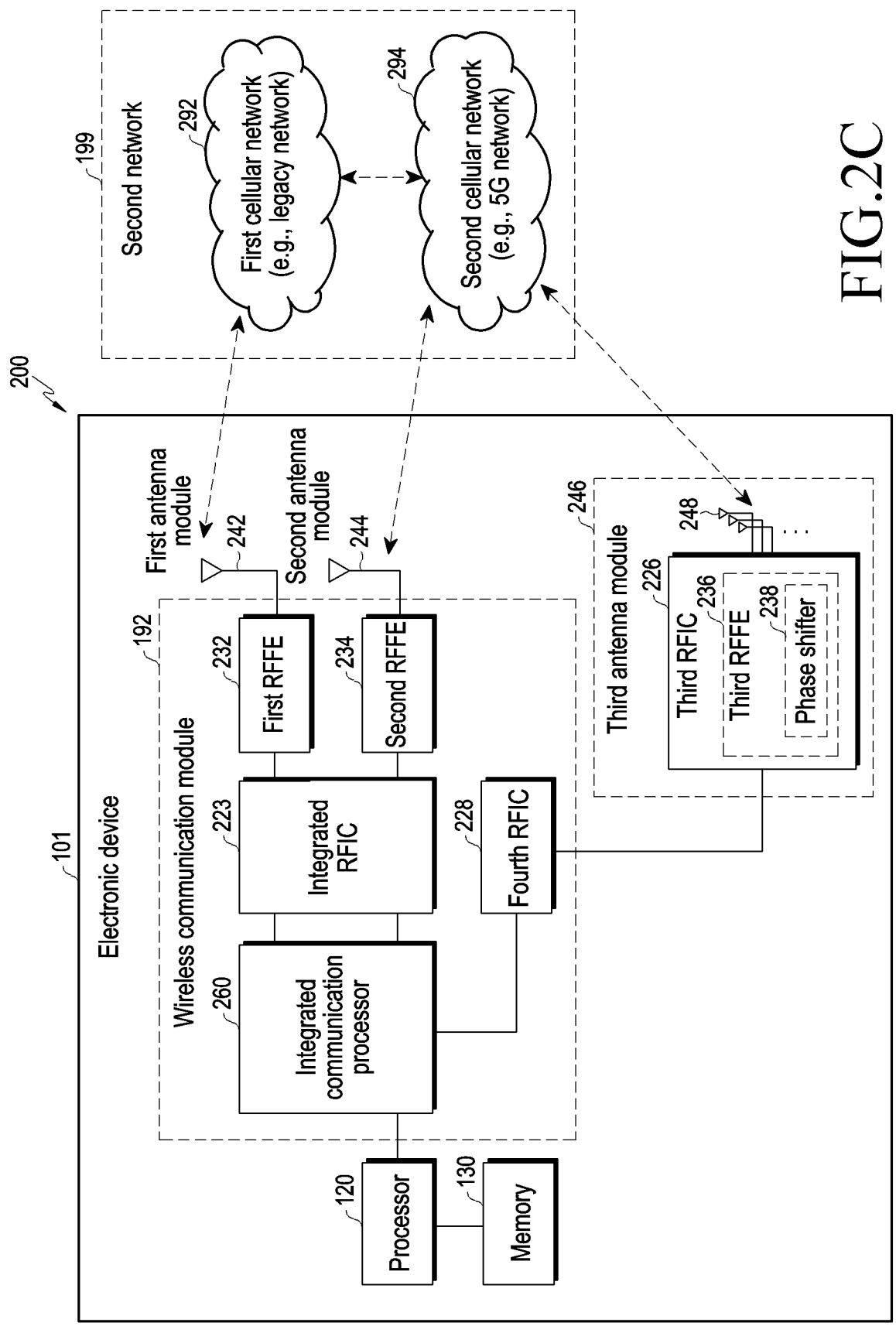
FIG. 2C is a view illustrating another example of an electronic device according to an embodiment of the disclosure.

FIG. 2A is a block diagram 200 illustrating an electronic device 101 for supporting legacy network communication and 5G network communication according to an embodiment of the disclosure. FIG. 2B is a view illustrating another example of an electronic device according to an embodiment of the disclosure. FIG. 2C is a view illustrating another example of an electronic device according to an embodiment of the disclosure.

Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. The second network 199 may include a first cellular network 292 and a second cellular network 294. According to another embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment, the fourth RFIC 228 may be omitted or be included as part of the third RFIC 226.

The first communication processor 212 may establish a communication channel of a band that is to be used for wireless communication with the first cellular network 292 or may support legacy network communication via the established communication channel. According to various embodiments, the first cellular network may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) among bands that are to be used for wireless communication with the second cellular network 294 or may support fifth generation (5G) network communication via the established communication channel. According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

According to an embodiment, the first communication processor 212 and the second communication processor 214 may be implemented in a single chip or a single package. According to an embodiment, the first communication processor 212 or the second communication processor 214, along with the processor 120, an assistance processor 123, or communication module 190, may be formed in a single chip or single package.

Referring to FIG. 2B, an integrated communication processor 260 may support all of the functions for communication with the first cellular network 292 and the second cellular network 294.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package.

Referring to FIG. 2C, according to various embodiments, when the first RFIC 222 and the second RFIC 224 in FIG. 2A or FIG. 2B are implemented as a single chip or a single package, they may be implemented as an integrated RFIC 223. In this case, the integrated RFIC is connected to the first RFFE 232 and the second RFFE 234 to convert a baseband signal into a signal of a band supported by the first RFFE 232 and/or the second RFFE 234, and may transmit the converted signal to one of the first RFFE 232 and the second RFFE 234. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main printed circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

Figure 3A:
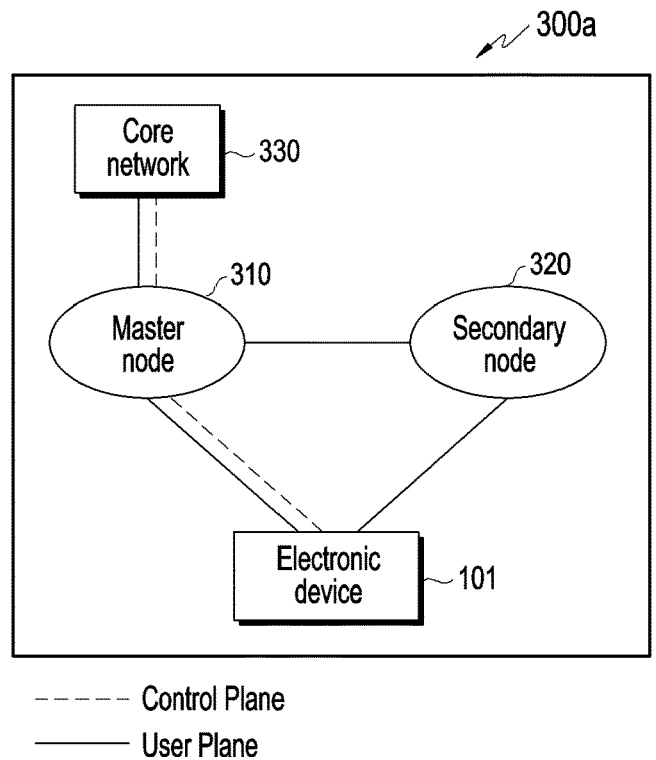
FIG. 3A is a view illustrating an example of a configuration of an electronic device according to an embodiment of the disclosure.
Figure 3B:
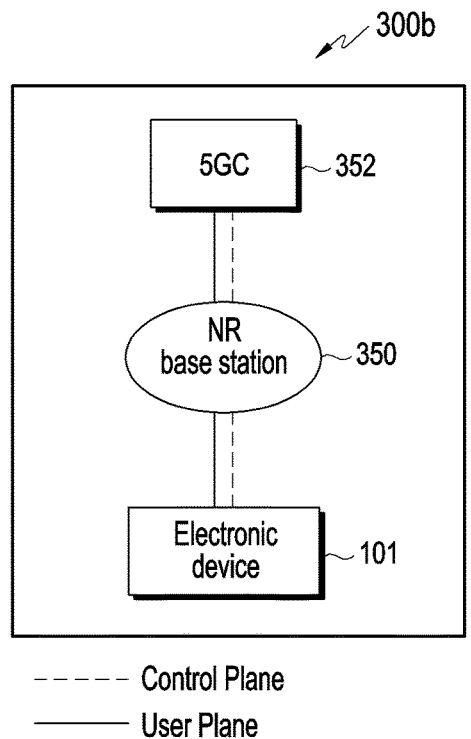
FIG. 3B is a view illustrating an example of a touch sensor device of an electronic device according to an embodiment of the disclosure.
Figure 3C:
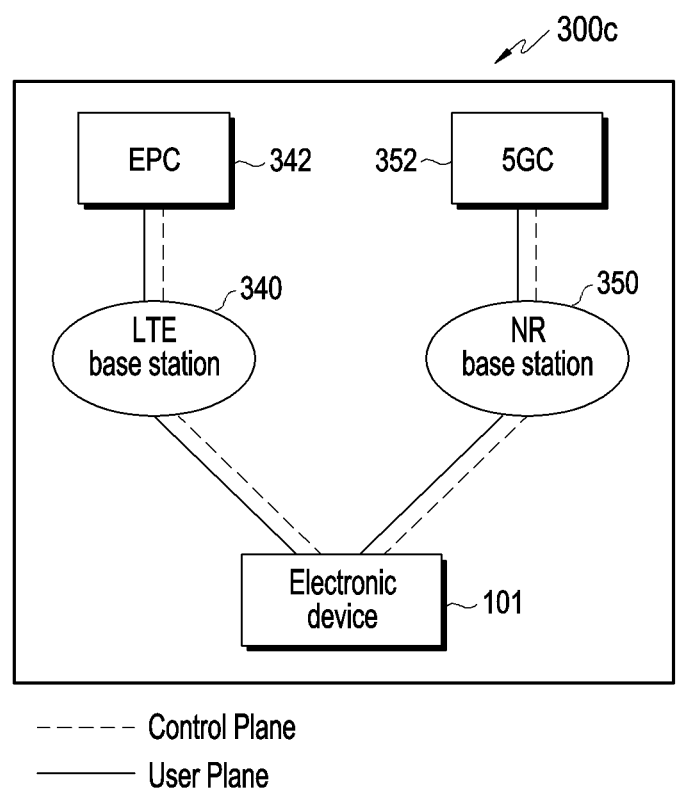
FIG. 3C is a view illustrating an example of a plurality of values for a plurality of nodes identified using a touch sensor device of an electronic device according to an embodiment of the disclosure.

FIGS. 3A, 3B, and 3C are views illustrating wireless communication systems providing legacy communication and/or 5G communication networks according to various embodiments of the disclosure.

Referring to FIGS. 3A, 3B, and 3C, the network environments 300a, 300b, and 300c may include at least one of a legacy network and a 5G network. The legacy network may include, e.g., a 3GPP-standard 4G or LTE base station 340 (e.g., an eNodeB (eNB)) that supports radio access with the electronic device 101 and an evolved packet core (EPC) 342 that manages 4G communication. The 5G network may include, e.g., a new radio (NR) base station 350 (e.g., a gNodeB (or gNB)) that supports radio access with the electronic device 101 and a 5th generation core (5GC) 352 that manages 5G communication for the electronic device 101.

According to an embodiment, the electronic device 101 may transmit or receive control messages and user data via legacy communication and/or 5G communication. The control messages may include, e.g., messages related to at least one of security control, bearer setup, authentication, registration, or mobility management for the electronic device 101. The user data may mean, e.g., user data except for control messages transmitted or received between the electronic device 101 and the core network 330 (e.g., the EPC 342).

Referring to FIG. 3A, according to an embodiment, the electronic device 101 may transmit or receive at least one of a control message or user data to/from at least part (e.g., the NR base station 350 or 5GC 352) of the 5G network via at least part (e.g., the LTE base station 340 or EPC 342) of the legacy network.

According to various embodiments, the network environment 300a may include a network environment that provides wireless communication dual connectivity (DC) to the LTE base station 340 and the NR base station 350 and transmits or receives control messages to/from the electronic device 101 via one core network 330 of the EPC 342 or the 5GC 352.

According to various embodiments, in the DC environment, one of the LTE base station 340 or the NR base station 350 may operate as a master node (MN) 310, and the other as a secondary node (SN) 320. The MN 310 may be connected with the core network 330 to transmit or receive control messages. The MN 310 and the SN 320 may be connected with each other via a network interface to transmit or receive messages related to radio resource (e.g., communication channel) management therebetween.

According to an embodiment, the MN 310 may include the LTE base station 340, the SN 320 may include the NR base station 350, and the core network 330 may include the EPC 342. For example, control messages may be transmitted/received via the LTE base station 340 and the EPC 342, and user data may be transmitted/received via at least one of the LTE base station 340 or the NR base station 350.

According to an embodiment, the MN 310 may include the NR base station 350, and the SN 320 may include the LTE base station 340, and the core network 330 may include the 5GC 352. For example, control messages may be transmitted/received via the NR base station 350 and the 5GC 352, and user data may be transmitted/received via at least one of the LTE base station 340 or the NR base station 350.

Referring to FIG. 3B, according to an embodiment, the 5G network may include the NR base station 350 and the 5GC 352 and transmit or receive control messages and user data independently from the electronic device 101.

Referring to FIG. 3C, according to an embodiment, the legacy network and the 5G network each may provide data transmission/reception independently. For example, the electronic device 101 and the EPC 342 may transmit or receive control messages and user data via the LTE base station 340. As another example, the electronic device 101 and the 5GC 352 may transmit or receive control messages and user data via the NR base station 350.

According to various embodiments, the electronic device 101 may be registered in at least one of the EPC 342 or the 5GC 352 to transmit or receive control messages.

According to various embodiments, the EPC 342 or the 5GC 352 may interwork with each other to manage communication for the electronic device 101. For example, mobility information for the electronic device 101 may be transmitted or received via the interface between the EPC 342 and the 5GC 352.

As set forth above, dual connectivity via the LTE base station 340 and the NR base station 350 may be referred to as E-UTRA new radio dual connectivity (EN-DC).

An example of an electronic device 400 (e.g., user equipment (UE)) is described below according to various embodiments.

Figure 4:
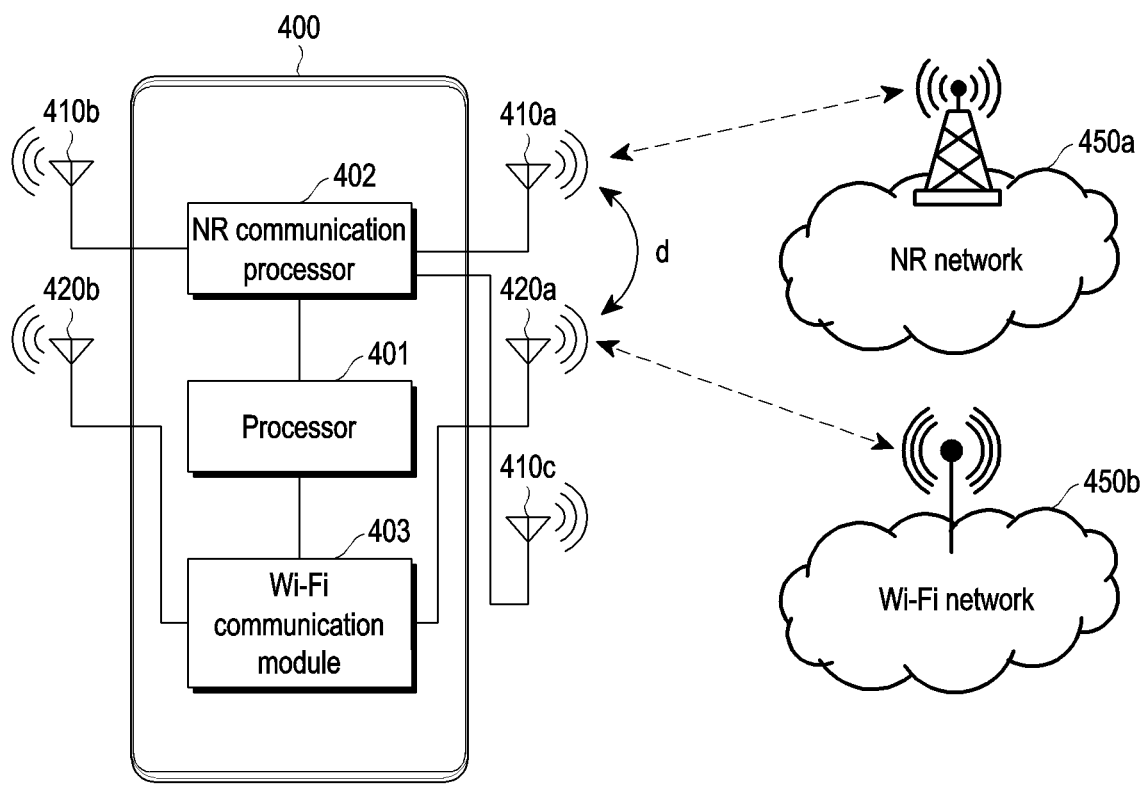
FIG. 4 is a view illustrating an example of an electronic device according to an embodiment of the disclosure.

FIG. 4 is a view illustrating an example of an electronic device 400 according to an embodiment of the disclosure.

Referring to FIG. 4, according to various embodiments, an electronic device 400 may perform communication using a plurality of radio access technologies (RATs) at the same time (or using multiple radio access technologies (RATs)). In an embodiment, the electronic device 400 may perform communication using a first radio access technology, which transmits and/or receives signals through a licensed spectrum, and a second radio access technology, which transmits/receives signals through an unlicensed spectrum. The licensed band may be a frequency band in which the communication carrier exclusively secures the right to use the frequency through a procedure, such as auction or purchase. In other words, the specific frequency band corresponding to the licensed band may only be used by a specific entity that has obtained the right to the licensed band, and the frequency for the licensed band cannot be used by other users or operators. In contrast, the unlicensed band may be an area in which exclusive use is not guaranteed. In this case, as an example, unlicensed band may mean a frequency band in which a large number of communication facilities or systems may coexist and be used. In this case, as an example, the unlicensed band may be used without restrictions by a large number of communication facilities as long as the adjacent bands are protected at a predetermined level or more and intra-band interference-related regulations are observed. For example, as illustrated in FIG. 4, the electronic device 400 may use a new radio access technology (NR) as the first radio access technology using a licensed frequency band and Wi-Fi communication as the second radio access technology using an unlicensed frequency band. The electronic device 400 may use, as component carriers (or carriers), the signals transmitted and/or received through the licensed frequency band used by the new radio (NR) access technology and the unlicensed frequency band used by Wi-Fi communication. The component carriers may be carrier-aggregated (CA). As an example, the component carrier of the licensed frequency band may be defined as a primary component carrier (hereinafter, PCC or PCell), and the component carrier of the unlicensed band may be defined as a secondary component carrier (hereinafter, SCC or SCell). Without limited to those described and/or shown, the first radio access technology for transmitting and/or receiving signals through the licensed frequency band may include a legacy network including a 2nd generation (2G), 3G, 4G, or long-term evolution (LTE) network, and the second radio access technology for transmitting and/or receiving signals through the unlicensed frequency band may include Bluetooth communication. However, without limited to those described, each radio access technology (e.g., the first and second radio access technologies) may include more types of radio access technologies. The multiple radio access technology using LTE using the licensed band and Wi-Fi using the unlicensed band may include LTE-license-assisted access (LAA) or LTE-U. In another embodiment, without limited to those described, the electronic device 400 may use multiple radio access technology (e.g., EN-DC) for transmitting and/or receiving all signals through the licensed band or multiple radio access technology for transmitting and/or receiving all signals through the unlicensed band. Although an example is described below in which the electronic device 400 uses multiple radio access technology which uses NR technology and Wi-Fi communication, the following embodiments may also be applied to the operation of the electronic device 400 using other types of multiple radio access technologies.

According to various embodiments, when using multiple radio access technology, the electronic device 400 may transmit and/or receive signals through a different antenna 410a, 410b, 410c, 420a, and 420b for each of the plurality of radio access technologies. For example, the electronic device 400 (e.g., the processor 401) may control a plurality of first antennas 410a, 410b, and 410c using an NR communication processor 402 for communication (e.g., signal transmission and/or reception) with an NR network 450a (e.g., a base station (e.g., eNB or gNB)) based on NR access technology and control a plurality of second antennas 420a and 420b using a Wi-Fi communication module 403 for communication with a Wi-Fi network 450b (e.g., an access point (AP)) based on Wi-Fi communication as shown in FIG. 4. The Wi-Fi communication module 403 may be a chip set including circuitry (e.g., a transceiver) and a processor for controlling the plurality of second antennas 420a and 420b. The plurality of first antennas 410a, 410b, and 410c and the plurality of second antennas 420a and 420b may be disposed adjacent to each other or apart from each other in the electronic device 400. According to an embodiment, the electronic device 400 may transmit and/or receive signals through a specific antenna. A plurality of frequency bands available per radio access technology may be preset, and the electronic device 400 may select at least one frequency band for communication from among the plurality of frequency bands and perform communication. For example, a plurality of NR frequency bands available for use in NR access technology and a plurality of Wi-Fi frequency bands available for use in Wi-Fi communication may be prepared. In this case, a frequency band available for each of the plurality of antennas 410a, 410b, 410c, 420a, and 420b may also be prepared and, accordingly, the electronic device 400 may transmit and/or receive signals through the antenna corresponding to a frequency band selected from among the plurality of antennas 410a, 410b, 410c, 420a, and 420b. For example, referring to FIG. 4, when performing communication through a first frequency band based on NR access technology, the electronic device 400 (e.g., the processor 401) may perform communication using a third antenna 410a among the plurality of first antennas 410a, 410b, and 410c and, when performing communication through a second frequency band based on the Wi-Fi communication module 403, perform communication through a fourth antenna 420a among the plurality of second antennas 420a and 420b. In this case, referring to FIG. 4, interference degradation may occur between the signals transmitted and/or received through each antenna based on the third antenna 410a and the fourth antenna 420a being positioned adjacent to each other. Accordingly, the specific absorption rate (SAR) required by the federal communications commission (FCC) may be increased so that a designated reference (e.g., less than a threshold (e.g., 1.6 W/kg)) is not met, and the total emission ratio (TER) fails to meet a designated reference (e.g., a threshold (e.g., 1)).

According to various embodiments, if the electronic device 400 uses multiple radio access technology, the electronic device 400 may adjust the magnitude of the power for transmitting signals through at least some of the plurality of antennas 410a, 410b, 410c, 420a, and 420b. For example, the designated reference may be the SPLS ratio of Equation 1 which applies the distance index (Ri) to the specific absorption rate (SAR) required by the federal communications commission (FCC).

$$SPLSRatio = \frac{(SAR1 + SAR2)^{1.5}}{Ri} \quad \text{Equation 1}$$

where Ri is the distance (d) between the antennas, and SAR1 and SAR2 are the respective SARs of the antennas.

In a case where the multiple radio access technology is used, even when the SAR required by the FCC, which uses each antenna, exceeds the threshold (e.g., 1.6 W/Kg), and TER exceeds the threshold (e.g., 1), if the SPLS ratio is the threshold (e.g., 1 g SAR reference 0.04 or 10 g SAR reference 0.1), the multiple radio access technology may exceptionally be allowed. In this case, since the SRS (e.g., SAR1 and SAR2 in Equation 1) of each antenna (e.g., the third antenna 410a and the fourth antenna 420a) is formed as a specific value based on the magnitude of transmission power being preset, the distance Ri between the antennas (e.g., the third antenna 410a and the fourth antenna 420a) at which the SPLS ratio is the threshold or less may be previously calculated. For example, for antennas which are positioned farther than a designated distance, the SPLS ratio may be set to be the threshold or less. Accordingly, in a case where multiple radio access technology is used, the electronic device 400 (e.g., the processor 401) may reduce the SAR value of some of the antennas to control the SPLS ratio to be the threshold or less by backing off the transmission power (Tx power) for transmitting signals through some of the antennas (e.g., reducing the upper limit of the transmission power by a specific value) if the distance between the antennas selected for communication is shorter than a designated distance and may refrain from back-off if the distance between the antennas is larger than the designated distance. For example, referring to FIG. 4, if the distance between the third antenna for using NR access technology and the fourth antenna for using Wi-Fi communication is shorter than the designated distance d, the electronic device 400 may back off the transmission power (Tx power) of the fourth antenna for using Wi-Fi communication. Further, if the distance between the antennas (e.g., the third antenna and the fourth antenna) is shorter than the designated distance d, the electronic device 400 may back off the transmission power (Tx power) by a specific value corresponding to the distance between the antennas (e.g., back off more if the distance is shorter). Alternatively, without limited to those described, the electronic device 400 may back off the transmission power of the third antenna for using NR communication. However, for ease of description, it is described below to back off the transmission power (Tx power) of the fourth antenna for use of Wi-Fi communication. The electronic device 400 (e.g., the processor 401) may previously store a back-off value corresponding to information about the NR frequency band used when using the NR access technology in the memory referenceable by the Wi-Fi communication module 403 for back-off of the transmission power of the antenna (e.g., the fourth antenna) for Wi-Fi communication and transfer information about the used NR frequency band to the Wi-Fi communication module 403. This is described below.

An example of a configuration of an electronic device 400 (e.g., user equipment (UE)) is described below according to various embodiments.

Figure 5:
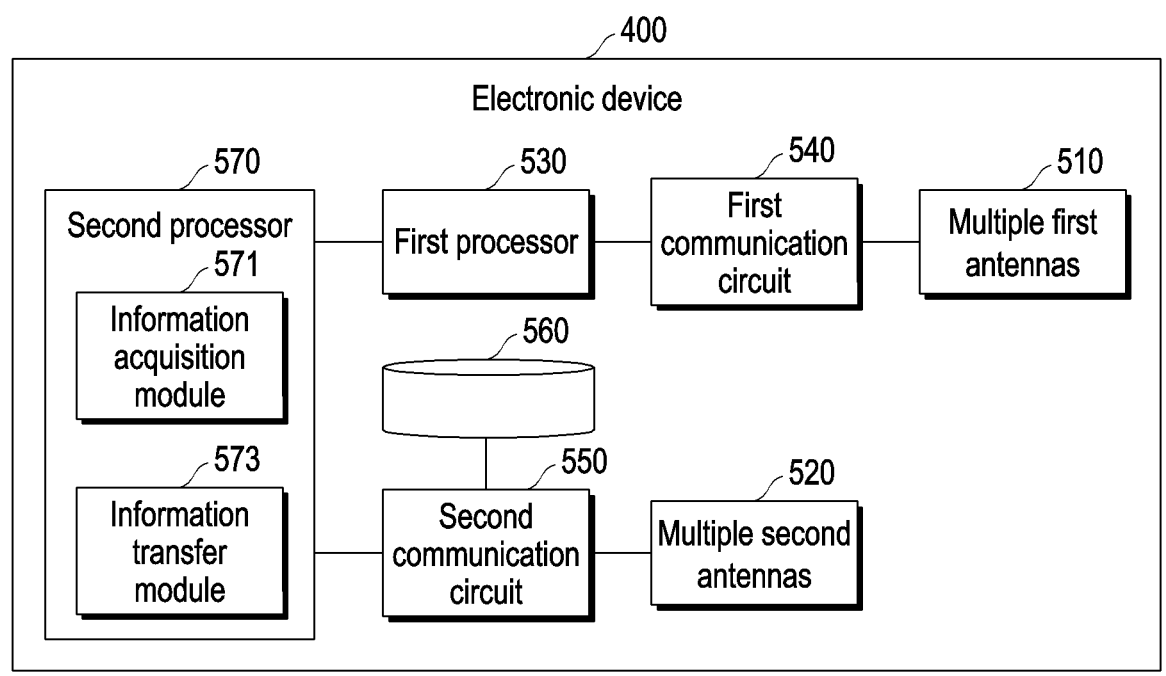
FIG. 5 is a view illustrating an example of a configuration of an electronic device according to an embodiment of the disclosure.

FIG. 5 is a view illustrating an example configuration of an electronic device 400 according to an embodiment of the disclosure. FIG. 5 is described below with reference to FIG. 6.

Figure 6:
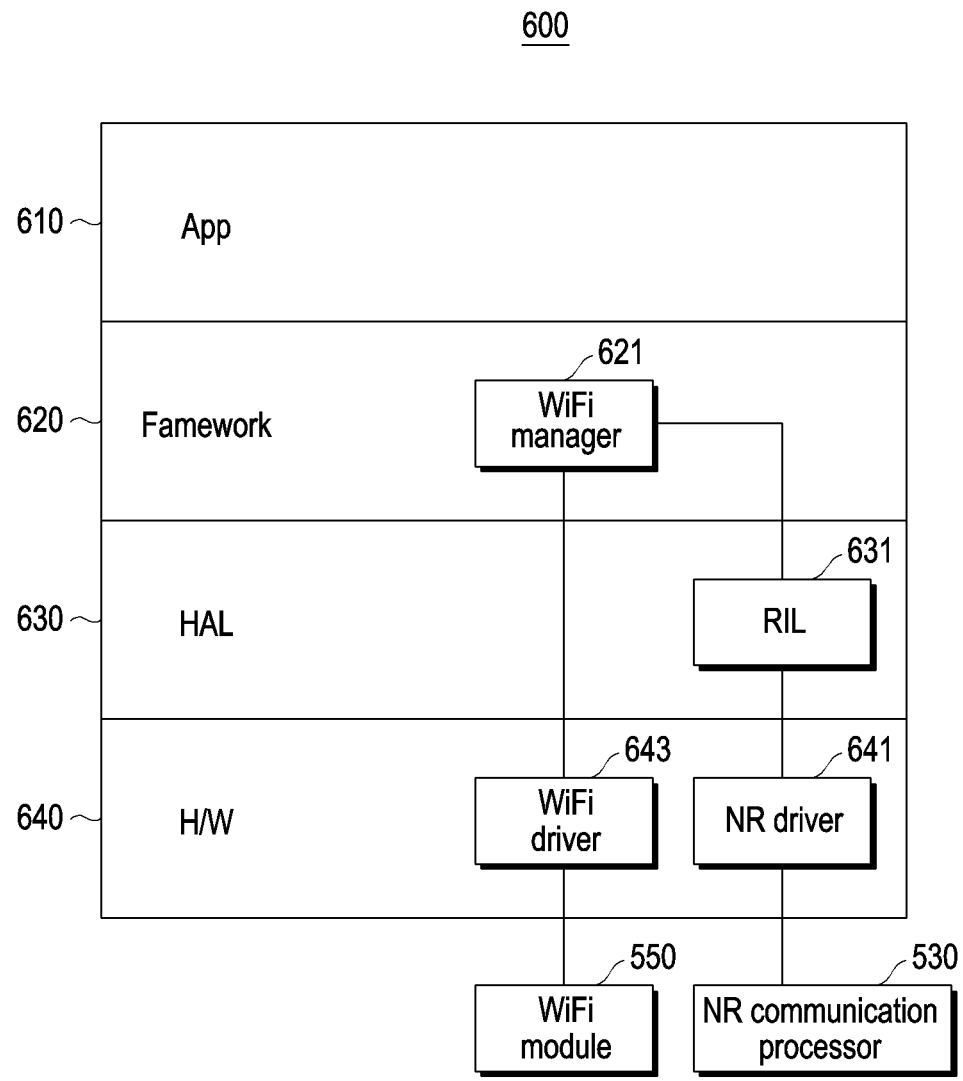
FIG. 6 is a view illustrating an example of a processor of an electronic device according to an embodiment of the disclosure.

FIG. 6 is a view illustrating an example of a processor 401 of an electronic device 400 according to an embodiment of the disclosure.

Referring to FIG. 5, an electronic device 400 may include a plurality of first antennas 510, a plurality of second antennas 520, a first communication circuit 540, a first processor 530 (e.g., the NR communication processor 402 of FIG. 4), a second communication circuit 550 (e.g., the Wi-Fi communication module 403 of FIG. 4), a memory 560, and a second processor 570 (e.g., the processor 401 of FIG. 4) including an information acquisition module 571 and an information transfer module 573. However, without limited to those shown and/or described, the electronic device 400 may be implemented to include more or less components. For example, the electronic device 400 may further include at least some of the components of the electronic device 101 described in FIG. 1 and the RFICs 222, 224, 226, and 228 and the RFFE 232, 234, and 236 described in connection with FIGS. 2A and 2B.

An example of the second processor 570 is first described below according to various embodiments. The second processor 570 may include at least one of an application processor (AP), a central processing unit (CPU), a graphic processing unit (GPU), a display processing unit (DPU), or a neural processing unit (NPU). At least some of the modules (e.g., the band information acquisition module 571 and the band information transfer module 573) described below may be implemented (e.g., executed) in software, firmware, or a combination of at least two or more thereof. For example, the modules may be implemented in the form of an application, program, computer code, instructions, routines, or processes, which are executable by the second processor 570. Thus, when the modules are executed by the second processor 570, the modules may trigger the second processor 570 to perform operations associated with the modules (or functions that the modules may provide). Therefore, when it is described below that a specific module performs an operation, it may be interpreted as the second processor 570 performing the operation as the specific module is executed. Or, the modules may be implemented as portions of a specific application. Or, without being limited to what is described and/or shown, each module may be implemented as a separate hardware device (e.g., a processor or control circuit) from the second processor 570.

According to various embodiments, the second processor 570 may perform communication with the outside (e.g., network) using the second communication circuit 550 (e.g., the Wi-Fi communication module 403), with the first processor 530 (e.g., the NR communication processor 402). For example, the second processor 570 may transfer data to be transmitted to the first processor 530 (e.g., the NR communication processor 402) or the second communication circuit 550 (e.g., the Wi-Fi communication module 403) to thereby control the first processor 530 (e.g., the NR communication processor 402) to covert the data into a signal and transmit the signal through the plurality of first antennas 510 or the second communication circuit 550 (e.g., the Wi-Fi communication module 403) to convert the data into a signal and transmit the signal through the plurality of second antennas 520. As described above, the second communication circuit 550 may be a chip set including a processor (not shown) and circuitry (e.g., transceiver) (not shown) for controlling the plurality of second antennas 420a and 420b.

According to various embodiments, the second processor 570 may be a relay device for exchanging information between the first processor 530 (e.g., the NR communication processor 402) and the second communication circuit 550 (e.g., the Wi-Fi communication module 403). For example, the second processor 570 may be electrically and/or operatively connected to each of the first processor 530 (e.g., the NR communication processor 402) and the second communication circuit 550 (e.g., the Wi-Fi communication module 403), and the first processor 530 (e.g., the NR communication processor 402) and the second communication circuit 550 (e.g., the Wi-Fi communication module 403) may transmit and/or receive information through the second processor 570. The information acquisition module 571 of the second processor 570 may receive communication-associated information, described below, (e.g., information about the NR frequency band) from the first processor 530 (e.g., the NR communication processor 402), and the information transfer module 573 may transfer the obtained communication-associated information to the second communication circuit 550 (e.g., the Wi-Fi communication module 403).

Referring to FIG. 6, when the processor 401 executes (or operates) an Android operating system (OS) 600, the information acquisition module 571 may be implemented as a radio interface layer (RIL) 631, and the information transfer module 573 may be implemented as a Wi-Fi manager 621. For example, the Android operating system may include an application layer (APP) 610, a framework layer (Framework) 620, a hardware abstraction layer (HAL) 630, and a hardware layer (H/W) 640. The RIL 631 may be implemented on the hardware abstraction layer (HAL) 630 and may receive communication-associated information (e.g., at least one of information about the NR frequency band, antenna identification information, or information about the communication connection state (e.g., RRC connected, RRC idle, and/or RRC inactive)) from the first processor 530 (e.g., the NR communication processor 402) using an NR driver 641 of the hardware layer (H/W) 640. The Wi-Fi manager 621 may be implemented on the framework layer (Framework) 620 and may receive communication-associated information (e.g., at least one of information about the NR frequency band, antenna identification information, or information about the RRC state) updated through the RIL 631. The Wi-Fi manager 621 may transfer the communication-associated information to the second communication circuit 550 (e.g., the Wi-Fi communication module 403) using the Wi-Fi driver 643 based on reception of the communication-associated information (or update of the communication-associated information).

According to various embodiments, the plurality of first antennas 510 may be implemented to transmit signals in the licensed band. For example, the plurality of first antennas 510 may be implemented to transmit signals based on NR radio access technology. In FIGS. 2A and 2B, they may be implemented as antenna modules (e.g., the first antenna module 242 and the second antenna module 244) implemented to transmit and/or receive Sub6-band (e.g., about 6 GHz or less) RF signals (hereinafter, 5G Sub6 RF signal) and, thus, no duplicate description is given. Without limited to those described, the plurality of first antennas 510 may be implemented as antennas (e.g., the antenna 248 of FIGS. 2A and 2B) implemented to transmit and/or receive 5G Above6-band (e.g., about 6 GHz to about 60 GHz) RF signals (hereinafter, 5G Above6 RF signals).

According to various embodiments, the plurality of second antennas 520 may be implemented to transmit signals in the unlicensed band. For example, the plurality of second antennas 520 may be implemented to transmit signals based on Wi-Fi communication. For example, the plurality of second antennas 520 may be implemented to transmit signals based on Wi-Fi schemes, such as 2G Wi-Fi, 5G Wi-Fi, 2G real simultaneous dual band (rsdb) Wi-Fi, and 5G rsdb Wi-Fi.

Hereinafter, examples of the first processor 530 (e.g., NR communication processor 402) and the second communication circuit 550 (e.g., Wi-Fi communication module 403) according to various embodiments are described.

According to various embodiments, the first processor 530 (e.g., the NR communication processor 402) and the second communication circuit 550 (e.g., the Wi-Fi communication module 403) may be communication circuits separately implemented to use different radio access technologies.

According to various embodiments, the first processor 530 (e.g., the NR communication processor 402) may be a processor implemented to perform communication based on a radio access technology using a licensed frequency band. For example, the first processor 530 (e.g., the NR communication processor 402) is a processor implemented to perform communication based on the NR access technology and may transmit and/or receive signals through one antenna among the plurality of first antennas 510 corresponding to the NR frequency band among the plurality of NR frequency bands for communication as described above in connection with FIG. 4. The first processor 530 (e.g., the NR communication processor 402) may be implemented as the communication processors 212, 214, and 260 described above in connection with FIGS. 2A and 2B and, thus, no duplicate description thereof is given. For example, the first processor 530 (e.g., the NR communication processor 402) may transmit and/or receive signals through the antenna corresponding to a frequency band selected from among the Sub-6 NR frequency bands among the plurality of first antennas 510. Meanwhile, without limited to those shown in FIG. 4, the first communication circuit 540 may be disposed between the first processor 530 (e.g., the NR communication processor 402) and the plurality of first antennas 510, and the first communication circuit 540 may mean the RFIC 222, 224, 226, or 228, and the RFFE 232, 234, or 236 described above in connection with FIGS. 2A and 2B. The first processor 530 (e.g., the NR communication processor 402) may output a signal using the first communication circuit 540.

According to various embodiments, when the first processor 530 (e.g., the NR communication processor 402) performs communication based on the NR access technology, the first processor 530 (e.g., the NR communication processor 402) may transfer communication-associated information to the second processor 570. For example, the communication-associated information may include at least one of information about the used NR frequency band or information about the communication connection state (e.g., RRC state) but, without limited to those described, may further include various types of information associated with communication. As described above, communication between the second processor 570 and the second processor 570 may be performed using the RIL 631 of the second processor 570. Meanwhile, the RRC state may include RRC connected, RRC idle, and/or RRC inactive. In the RRC_IDLE state, the electronic device 400 may not be RRC-connected to a network (e.g., the NR network 450a). While the electronic device 400 specifies discontinuous reception (DRX) configured by the NAS and the electronic device 400 is assigned a specific ID in the tracking area, the electronic device 400 may receive a broadcast of paging information and system information from the network (e.g., the NR network 450a). Further, in the RRC_IDLE state, no RRC context is stored in the network (e.g., the NR network 450a). In the RRC_CONNECTED state, the electronic device 400 may make an RRC connection to the network (e.g., the NR network 450a) and may have a context in the network (e.g., the NR network 450a) and thereby transmit and/or receive data to/from the network (e.g., the NR network 450a). Further, the electronic device 400 may report channel quality information and feedback information to the network (e.g., the NR network 450a). In the RRC_INACTIVE state, the electronic device 400 is not RRC-connected to the network (e.g., the NR network 450a), but UE reachability is managed by the RAN using auxiliary information from the core network. Further, when the electronic device 400 is in the RRC Inactive state, UE paging is managed by the RAN. Further, when the electronic device 400 is in the RRC Inactive state, the UE monitors paging using the CN and RAN identifiers of the UE.

According to various embodiments, the second communication circuit 550 (e.g., the Wi-Fi communication module 403) may be a communication circuit implemented to perform communication based on a radio access technology using an unlicensed frequency band. For example, the second communication circuit 550 (e.g., the Wi-Fi communication module 403) may transmit and/or receive signals through an antenna among a plurality of second antennas 520 corresponding to the Wi-Fi frequency band selected from among the plurality of Wi-Fi frequency bands for communication as described above in connection with FIG. 4. For example, the second communication circuit 550 (e.g., the Wi-Fi communication module 403) may be implemented to support Wi-Fi schemes (or functions), such as 2G Wi-Fi, 5G Wi-Fi, 2G real simultaneous dual band (rsdb) Wi-Fi, or 5G rsdb Wi-Fi, select at least one antenna from among the plurality of second antennas 520 for each communication scheme, and transmit and/or receive signals through the selected antenna. Although not shown, the communication module may be implemented to include a control circuit and/or a processor for back-off of transmission power (Tx power) which is described below. In an embodiment, the memory 560 may previously store information for controlling the magnitude of the transmission power corresponding to each of the NR frequency bands. When receiving information about the NR frequency band currently used from the processor 401, the second communication circuit 550 (e.g., the processor (not shown) of the Wi-Fi communication module 403) may obtain specific information for controlling the magnitude of the transmission power corresponding to the information about the currently used NR frequency band based on comparison between the information pre-stored in the memory 560 and the received NR frequency band information. The communication module may control the magnitude of transmission power of one antenna used for Wi-Fi communication among the plurality of second antennas 520 based on the specific information. In an embodiment, the second communication circuit 550 (e.g., the Wi-Fi communication module 403) may back off the transmission power. The back-off operation may mean reducing the upper limit of the transmission power by a designated value. The transmission power may mean a size in dB of the power applied to an antenna (e.g., power output from a power amplifier connected to the antenna) to transmit a signal through the one antenna. Meanwhile, the memory 560 may be implemented to previously store information for controlling the magnitude of transmission power corresponding to each of the plurality of first antennas 510 for using the NR access technology. When receiving information about the antenna currently used for NR access technology-based communication (e.g., antenna identification information (or antenna config information)) from the second processor 570, the second communication circuit 550 (e.g., the processor (not shown) of the Wi-Fi communication module 403) may obtain specific information for controlling the magnitude of the transmission power corresponding to the information about the currently used antenna based on comparison between the information pre-stored in the memory 560 and the received antenna information.

An example of operations of an electronic device 400 (e.g., user equipment (UE)) is described below according to various embodiments.

According to various embodiments, when multiple radio access technology-based communication using NR radio access technology and Wi-Fi communication is performed, the electronic device 400 may receive communication-associated information (e.g., information about the used NR frequency band) from the first processor 530 (e.g., the NR communication processor 402) and transfer it to the second communication circuit 550 (e.g., the Wi-Fi communication module 403 of FIG. 4). The second communication circuit 550 (e.g., the Wi-Fi communication module 403 of FIG. 4) may back-off the transmission power by a magnitude corresponding to the received communication-associated information.

Figure 7:
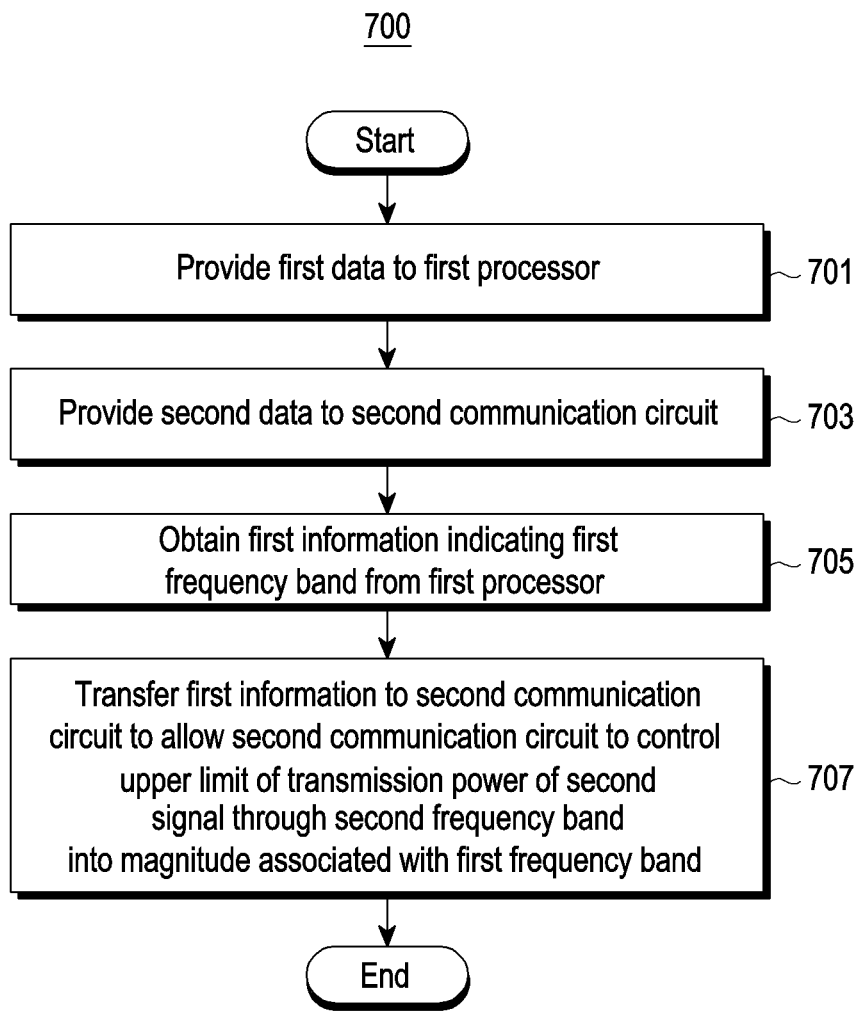
FIG. 7 is a flowchart illustrating an example of an operation of an electronic device according to an embodiment of the disclosure.

FIG. 7 is a flowchart 700 illustrating an example of an operation of an electronic device 400 according to an embodiment of the disclosure.

Referring to FIG. 7, the operations are not limited to the shown order but may rather be performed in other various orders. According to various embodiments, more or less operations than those of FIG. 7 may be performed. FIG. 7 is described below with reference to FIGS. 8A and 8B.

Figure 8A:
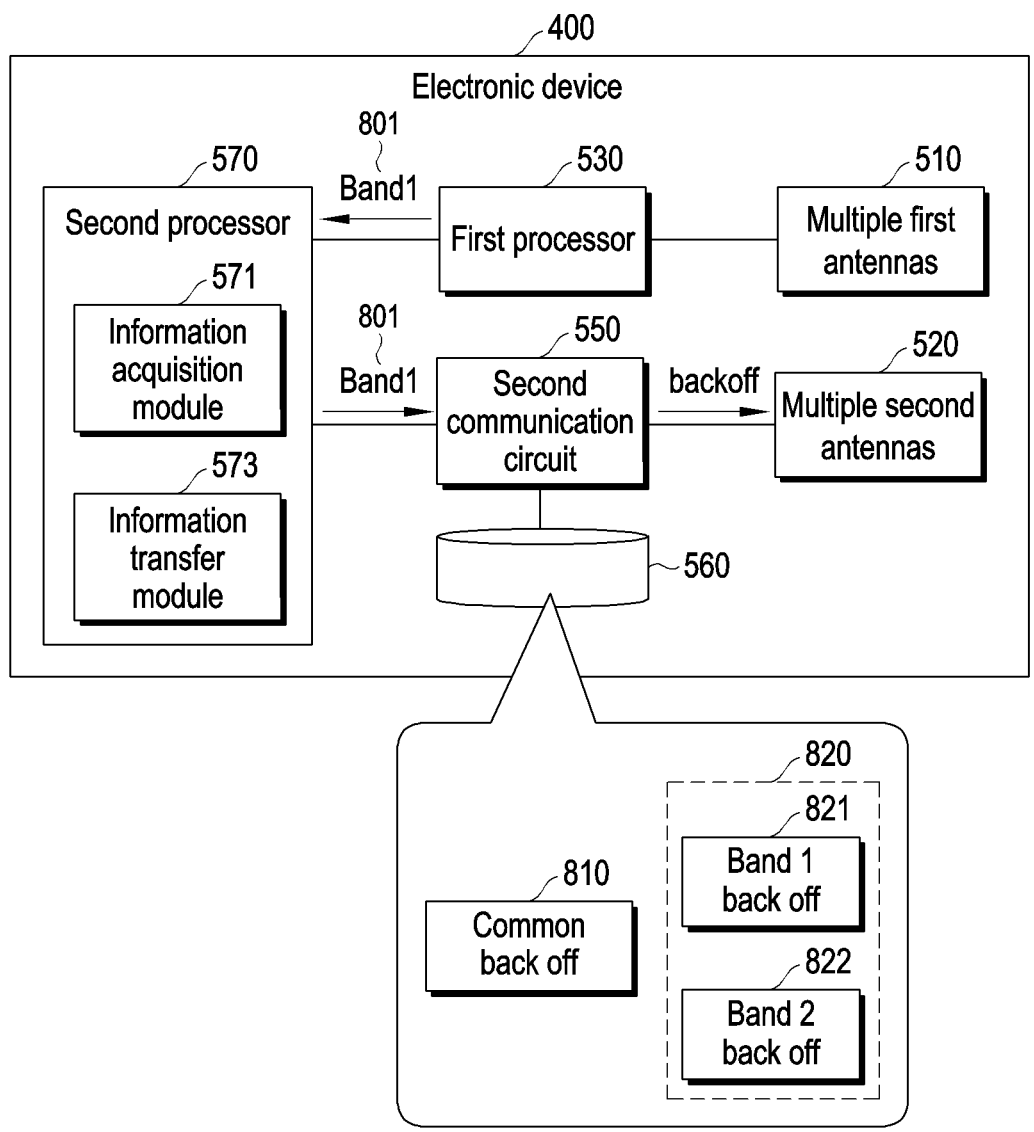
FIG. 8A is a view illustrating an example of an operation of backing off transmission power for Wi-Fi communication of an electronic device according to an embodiment of the disclosure.
Figure 8B:
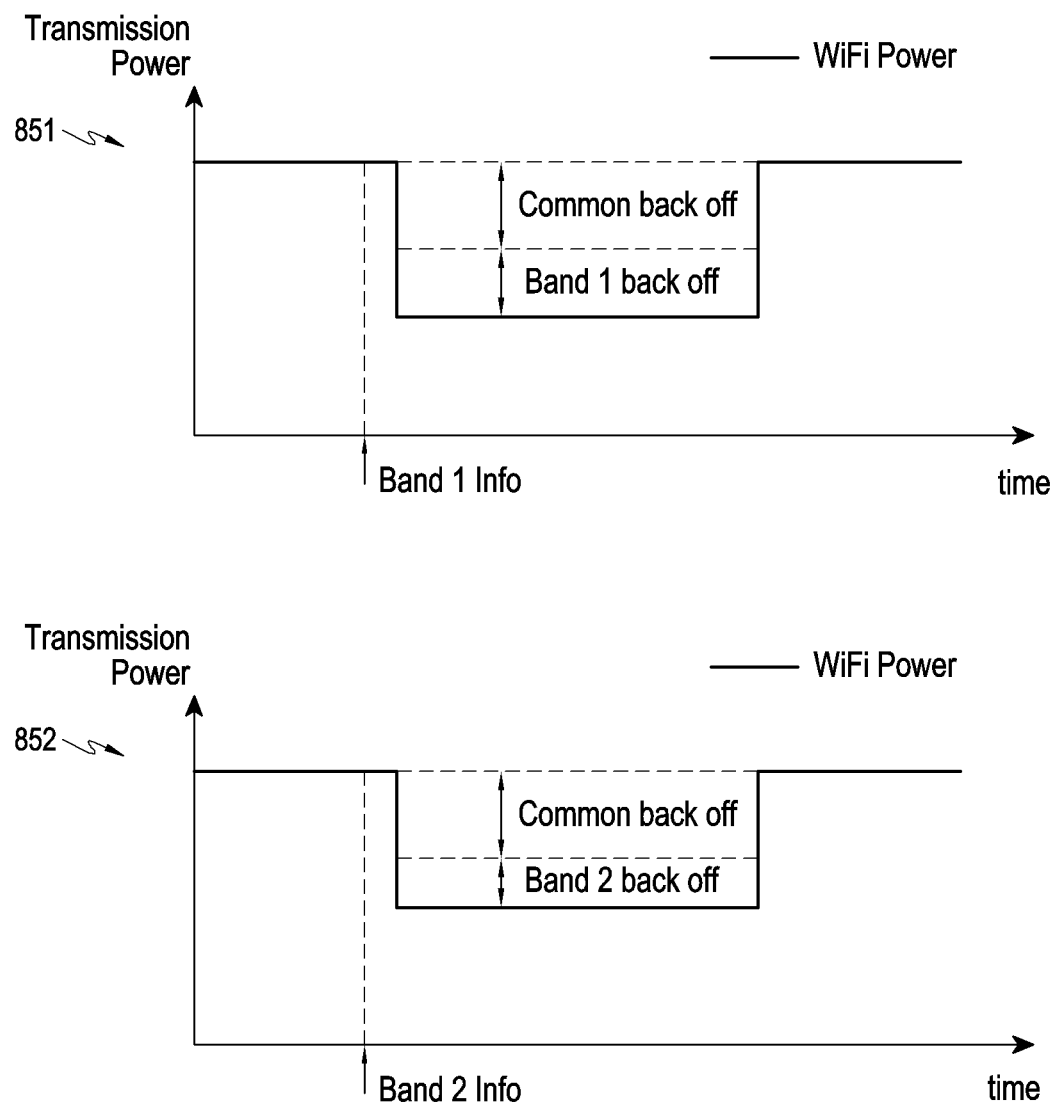
FIG. 8B is a view illustrating an example of an operation of backing off transmission power for each NR frequency band of an electronic device according to an embodiment of the disclosure.

FIG. 8A is a view illustrating an example of an operation of backing off transmission power for Wi-Fi communication of an electronic device 400 according to an embodiment of the disclosure. FIG. 8B is a view illustrating an example of an operation of backing off transmission power for each NR frequency band of an electronic device 400 according to an embodiment of the disclosure.

According to various embodiments, the electronic device 400 (e.g., the processor 401 of FIG. 4, or the second processor 570 of FIG. 5) may provide first data to the first processor 530 in operation 701 and provide second data to the second communication circuit 550 in operation 703. As described above, the electronic device 400 may perform communication using a multiple wireless access technology. For example, the electronic device 400 may perform communication through NR access technology using a licensed frequency band and Wi-Fi communication using an unlicensed frequency band. For example, when a mobile hotspot function is activated by the user, the electronic device 400 may establish a communication connection with a network (e.g., a base station) using the NR access technology and establish a communication connection with another external electronic device (e.g., another UE) using Wi-Fi communication, and may perform communication based on NR access technology and Wi-Fi communication. As another example, when a call based on the NR access technology is received (e.g., received through the network (e.g., a base station)) while performing communication based on Wi-Fi communication, the electronic device 400 may perform communication based on NR access technology and Wi-Fi communication. Referring to FIG. 7, the electronic device 400 may transfer first data, to be transmitted, to the first processor 530 (e.g., the NR communication processor 402 of FIG. 4) for communication based on NR access technology and transfer second data, to be transmitted, to the second communication circuit 550 (e.g., the Wi-Fi communication module 403 of FIG. 4) for communication based on Wi-Fi communication.

According to various embodiments, the first processor 530 (e.g., the NR communication processor 402 of FIG. 4), receiving the first data, may identify the first frequency band among the plurality of NR frequency bands based on negotiation with the network (e.g., allocation of frequency resource by the network) and select the third antenna from among the plurality of first antennas 510 for communication. For example, as described above in connection with FIGS. 5 and 6, an antenna used per frequency band may be preset. The first processor 530 (e.g., the NR communication processor 402 of FIG. 4) may identify the third antenna corresponding to the first frequency band among the plurality of first antennas 510 based on identifying the first frequency band. The first processor 530 may convert the received first data into a first signal (e.g., conversion using an RFIC and an RFFE) and transmit the first signal to the NR network (e.g., base station) through the first frequency band using the selected third antenna. As an example, the first processor 530 (e.g., the NR communication processor 402 of FIG. 4) may use Sub 6-NR and transmit the first signal using the corresponding antenna through one frequency band among the NR frequency bands corresponding to Sub 6-NR.

According to various embodiments, the second communication circuit 550 (e.g., the Wi-Fi communication module 403 of FIG. 4), receiving the second data, may identify the second frequency band for Wi-Fi communication and select the fourth antenna from among the plurality of second antennas 520 for communication. For example, the second communication circuit 550 (e.g., the Wi-Fi communication module 403 of FIG. 4) may select one communication scheme from among the Wi-Fi communication schemes for Wi-Fi communication. For example, the communication circuit may be implemented to provide 2G Wi-Fi, 5G Wi-Fi, 2G real simultaneous dual band (rsdb) Wi-Fi, and 5G rsdb Wi-Fi as Wi-Fi communication schemes. The electronic device 400 may display available Wi-Fi communication schemes on an interface (or a settings window) for setting Wi-Fi communication and, when one communication scheme is selected from among the Wi-Fi communication schemes by the user, perform Wi-Fi communication based on the selected communication scheme. The second communication circuit 550 (e.g., the Wi-Fi communication module 403 of FIG. 4) may identify the second frequency band corresponding to the selected communication scheme and select the fourth antenna corresponding to the identified second frequency band from among the plurality of second antennas 520. There may be one or more (i.e., multiple) fourth antennas selected. The second communication circuit 550 (e.g., the Wi-Fi communication module 403 of FIG. 4) may convert the received second data into a second signal and transmit the second signal through the fourth antenna, selected from among the plurality of second antennas 520, to the Wi-Fi network (e.g., access point (AP)).

In this case, as described above, the first signal in the first frequency band for communication based on NR access technology and the second signal in the second frequency band for Wi-Fi communication may individually be carriers and may be carrier-aggregated.

According to various embodiments, the electronic device 400 (e.g., the processor 401 of FIG. 4 or the second processor 570 of FIG. 5) may obtain first information indicating the first frequency band from the first processor 530 in operation 705. For example, the second processor 570 (e.g., the second processor 570 of FIG. 5) may receive communication-associated information from the first processor 530 (e.g., the NR communication processor 402 of FIG. 4). The communication-associated information may include information about the used NR frequency band or information about the communication connection state (e.g., RRC connected, RRC idle and/or RRC inactive) but, without limited to those described, may further include various types of information associated with communication. Since the transfer of the communication-associated information may be performed through the RIL described with reference to FIGS. 5 and 6, a redundant description will be omitted.

In an embodiment, the first processor 530 (e.g., the NR communication processor 402 of FIG. 4) may transfer the communication-associated information (e.g., the information 801 about the NR frequency band) to the second processor 570 (e.g., the processor 401) in response to meeting a designated first condition. For example, meeting the designated first condition may include identifying transmission of a signal to the network based on NR access technology, identifying an event where the communication state (e.g., RRC state) is changed, and/or establishing a communication connection with the network (e.g., a base station) (e.g., becoming the RRC connected state). For example, upon receiving a response signal (e.g., a reply to the RRC preamble or a paging signal) triggering the first processor 530 to transmit a signal from the network, the first processor 530 (e.g., the NR communication processor 402 of FIG. 4) may identify an event of transmitting a signal (e.g., RRC connected request) based on the response signal and, based thereupon, transfer communication-associated information (e.g., information 801 used for the NR frequency band used for signal transmission) to the second processor 570 (e.g., the processor 401). As another example, the first processor 530 (e.g., the NR communication processor 402 of FIG. 4) may manage the RRC state, identify an event where the RRC state is changed and, based thereupon, transfer communication-associated information (e.g., information about the NR frequency band and/or information about the RRC state) to the second processor 570 (e.g., the processor 401). In particular, the first processor 530 (e.g., the NR communication processor 402 of FIG. 4) is implemented to transfer only information about the RRC state, as the communication-associated information, to the second processor 570 when the RRC state is changed to the RRC idle state or RRC inactive state but, when the RRC state is changed to the RRC connected state, the first processor 530 (e.g., the NR communication processor 402 of FIG. 4) may be implemented to transfer information about the used NR frequency band. Further, without limited to those described, even when the RRC state is changed to the RRC idle state or RRC inactive state, information about the NR frequency band used in the prior RRC connected state, along with the above-described RRC state information, may be transferred and, even when the RRC state is changed to the RRC connected state, information about the RRC state may be transferred together with the information 801 about the NR frequency band.

In another embodiment, the second processor 570 (e.g., the processor 401) may send a request for communication-associated information to the first processor 530 (e.g., the NR communication processor 402 of FIG. 4) and, based on the request, receive communication-associated information (e.g., information 801 about the NR frequency band) from the first processor 530 (e.g., the NR communication processor 402 of FIG. 4). For example, meeting the designated second condition may include identifying an event where communication is performed based on NR access technology and/or identifying an event where multiple radio access technology based on NR access technology and Wi-Fi communication is used. As an example, the first processor 530 may identify an event of communication based on the NR access technology based on identifying whether the second processor 570 (e.g., the processor 401) is activated or identifying an occurrence of an event for using NR access technology (e.g., identify an event when the second processor 570 is activated or identify the user's input for establishing communication based on NR access technology). As another example, the first processor 530 may identify an occurrence of an event of using multiple radio access technology based on NR access technology and Wi-Fi communication (e.g., activation of the mobile hotspot function or reception of a call based on NR while Wi-Fi communication is performed) as described above. As another example, when the second processor 570 and the second communication circuit 550 are activated, the first processor 530 may identify an event of identifying multiple radio access technology based on the NR access technology and Wi-Fi communication.

According to various embodiments, the electronic device 400 (e.g., the processor 401 of FIG. 4 or the second processor 570 of FIG. 5) may transfer the first information to the second communication circuit 550 for the second communication circuit 550 to control the upper limit of the transmission power of the second signal to a magnitude associated with the first frequency band through the second frequency band in operation 707. For example, the electronic device 400 (e.g., the information transfer module 573 of the second processor 570) may transfer the received communication-associated information (e.g., information 801 about the NR frequency band) to the second communication circuit 550 (e.g., the Wi-Fi communication module 403 of FIG. 4) in response to receiving the communication-associated information (e.g., the information 801 about the NR frequency band) from the first processor 530 (e.g., the NR communication processor 402 of FIG. 4). Alternatively, the electronic device 400 (e.g., the information transfer module 573 of the second processor 570) may transfer the communication-associated information (e.g., the information 801 about the NR frequency band) to the second communication circuit 550 (e.g., the Wi-Fi communication module 403 of FIG. 4) based on identifying that multiple radio access technology based on NR radio access technology and Wi-Fi communication is identified. Since the transfer of the communication-associated information (e.g., the information 801 about the NR frequency band) may be performed through the Wi-Fi manager described in connection with FIGS. 5 and 6, no duplicate description thereof is given. Referring to FIG. 8A, the second communication circuit 550 (e.g., the processor (not shown) of the Wi-Fi communication module 403 of FIG. 4) may set an upper limit of the transmission power of the second signal based on Wi-Fi communication corresponding to the currently used NR frequency band based on comparison between the per-NR frequency band back-off information 810 and 820 pre-stored in the memory 560 and the received communication-associated information (e.g., the information 801 about the NR frequency band). For example, a designated back-off value 810 (e.g., a common back-off value) and per-NR frequency band back-off values 821 and 822 may be previously stored in the memory 560. In an embodiment, when the information 801 about the NR frequency band is received, the second communication circuit 550 (e.g., the processor (not shown) of the Wi-Fi communication module 403 of FIG. 4) may identify the back-off value 820 corresponding to the NR frequency band, along with the common back-off value 810 by referring to the memory 560 and reduce the upper limit of transmission power by a value obtained by adding the identified back-off values 810 and 820. Referring to 851 of FIG. 8B, if information corresponding to a first NR frequency band is received, the second communication circuit 550 (e.g., the processor (not shown) of the Wi-Fi communication module 403 of FIG. 4) may reduce the current upper limit of transmission power by a value Band 1 back off which is obtained by adding the back-off value 821 corresponding to the first NR frequency band to the common back-off value and, referring to 852 of FIG. 8B, if information corresponding to a second NR frequency band is received, reduce the current upper limit of transmission power by a value Band 2 back off which is obtained by adding the back-off value 822 corresponding to the second NR frequency band to the common back-off value. In this case, the memory 560 may store the value backed off per Wi-Fi communication scheme (e.g., 2G Wi-Fi, 5G Wi-Fi, 2G real simultaneous dual band (rsdb) Wi-Fi, or 5G rsdb scheme) for each NR frequency band. The second communication circuit 550 (e.g., the processor (not shown) of the Wi-Fi communication module 403 of FIG. 4) may identify the back-off value corresponding to the currently used Wi-Fi communication scheme among the per-Wi-Fi communication scheme back-off values corresponding to the received NR frequency band. In this case, if a plurality of second antennas are selected from among the plurality of second antennas for each Wi-Fi communication scheme, a back-off value may be stored for each of the plurality of antennas. For example, referring to Table 1 below, the sub 6 NR frequency band selected by the first processor 530 (e.g., the NR communication processor 402 of FIG. 4) of the electronic device 400 may be "band 2, band 25, band 66, band 77" as described below, and code information indicating the back-off value for each of the Wi-Fi communication schemes, i.e., 2G, 5G, rsdb 2G, and rsdb 5G, in each NR frequency band. In this case, two bits in the following code may denote the back-off value of one antenna, and "01" may mean that the back-off value is 0.25 dB. Accordingly, referring to Table 1, in a case where the sub 6 NR band 2 information is received, and the currently used Wi-Fi communication scheme is 2G, the second communication circuit 550 (e.g., the processor (not shown) of the Wi-Fi communication module 403 of FIG. 4) may identify the "0102" code from the memory 560 and, based thereupon, identify that the back-off value of one antenna among the fourth antennas is 0.25 dB, and the back-off value of the other antenna is 0.5 dB.

TABLE 1

Sub6 NR band information
- nr_sub6_band2_dynsar
- nr_sub6_band25_dynsar
- nr_sub6_band41_dynsar
- nr_sub6_band66_dynsar
- nr_sub6_band77_dynsar
back-off value per sub6 NR band information
Format: nr_sub6_bandXX_dynsar" = {{2g},{5g}, {rsdb_2g},{rsdb_5g}}
nr_sub6_band2_dynsar=0x0102,0x0304,0x0708,0x090a
nr_sub6_band25_dynsar=0x0304,0x0506,0x090a,0x0b0c
nr_sub6_band41_dynsar=0x0506,0x0708,0x0b0c,0x0d0e
nr_sub6_band48_dynsar=0x0708,0x090a,0x0d0e,0x010
nr_sub6_band66_dynsar=0x090a,0x0b0c,0x0102,0x0304
nr_sub6_band77_dynsar=0x0b0c,0x0d0e,0x0304,0x0506

Meanwhile, according to various embodiments, if the memory 560 includes no back-off value corresponding to the information about the NR frequency band, the second communication circuit 550 (e.g., the processor (not shown) of the Wi-Fi communication module 403 of FIG. 4) may maintain the current upper limit of transmission power or reduce the current upper limit of transmission power by a designated back-off value 810. An example of operations of the electronic device 400 (e.g., user equipment (UE)) according to various embodiments is described below.

According to various embodiments, upon transmitting signals through antennas based on multiple radio access technology using NR radio access technology and Wi-Fi communication, the electronic device 400 may back off the transmission power of the antenna transmitting signals based on Wi-Fi. In this case, the distance between the antennas may be a designated distance associated with the SPLS ratio.

Figure 9:
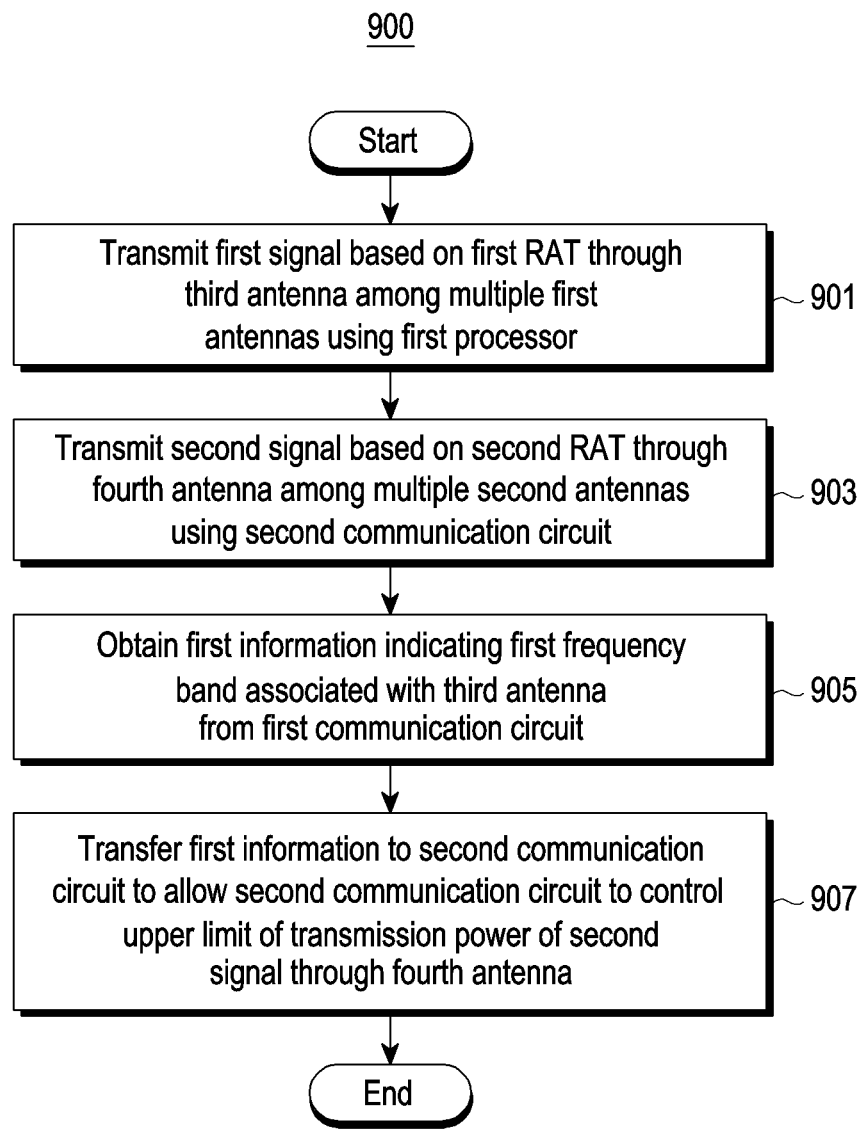
FIG. 9 is a flowchart illustrating an example of an operation of an electronic device according to an embodiment of the disclosure.

FIG. 9 is a flowchart 900 illustrating an example of an operation of an electronic device 400 according to an embodiment of the disclosure.

Referring to FIG. 9, the operations are not limited to the shown order but may rather be performed in other various orders. According to various embodiments, more or less operations than those of FIG. 9 may be performed. FIG. 9 is described below with reference to FIG. 10.

Figure 10:
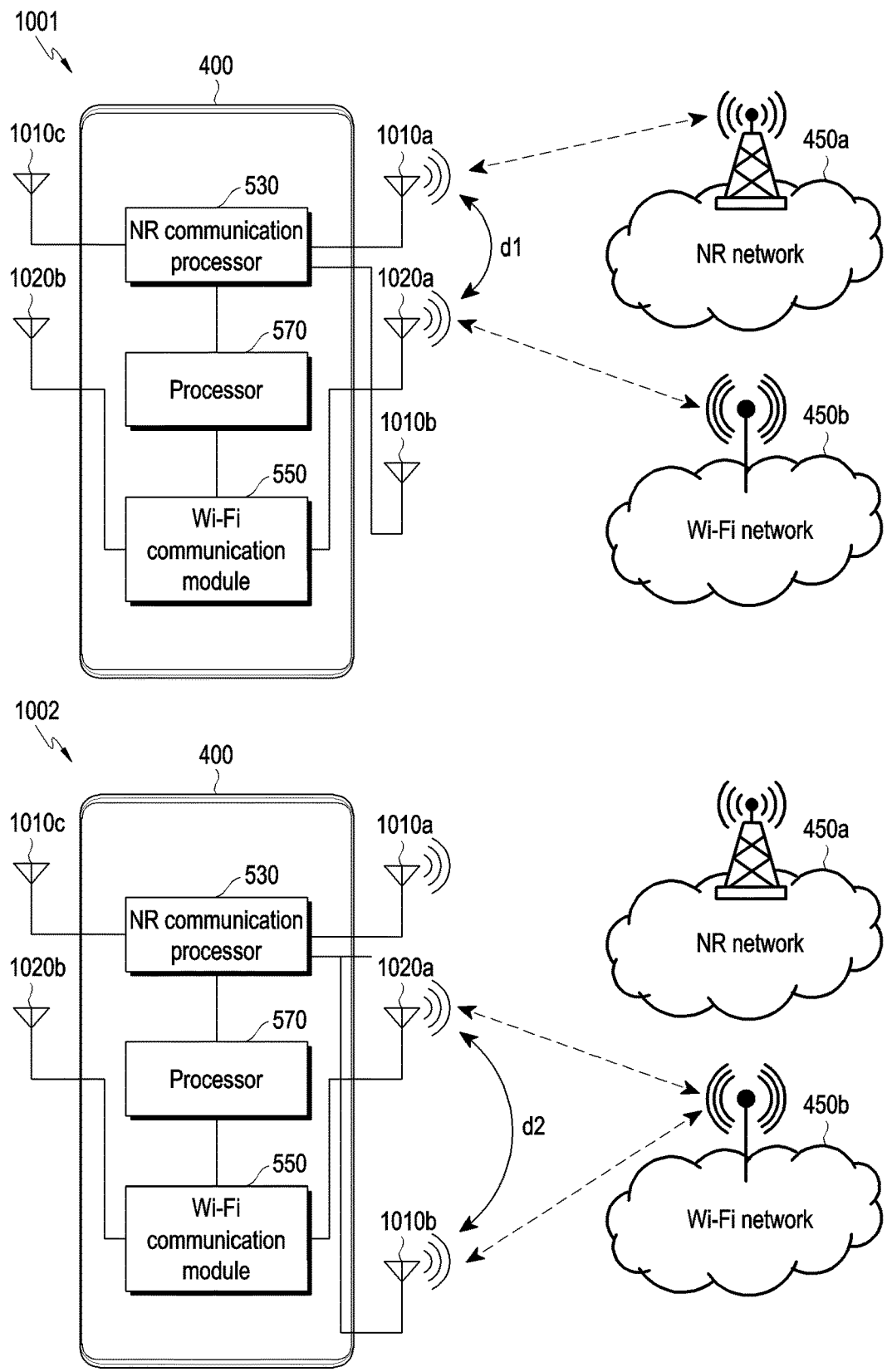
FIG. 10 is a view illustrating an example of using multiple radio access technology using some of a plurality of antennas of an electronic device according to an embodiment of the disclosure.

FIG. 10 is a view illustrating an example of using multiple radio access technology using some of a plurality of antennas of an electronic device 400 according to an embodiment of the disclosure.

Referring to FIG. 10, according to various embodiments, in operation 901, the electronic device 400 (e.g., the processor 401 of FIG. 4) may transmit a first signal based on a first RAT through a third antenna among the plurality of first antennas 510 using the first processor 530 and, in operation 903, transmit a second signal based on a second RAT through a fourth antenna among the plurality of second antennas 520 using the second communication circuit 550. For example, in the case of using multiple radio access technology using NR access technology and Wi-Fi communication, the electronic device 400 (e.g., the processor 401) may transfer first data to the first processor 530 (e.g., the NR communication processor 402 of FIG. 4) and second data to the second communication circuit 550 (e.g., the processor (not shown) of the Wi-Fi communication module 403 of FIG. 4). The first processor 530 (e.g., the NR communication processor 402 of FIG. 4) may select a specific NR frequency band and transmit the first signal, into which the first data is converted, through the third antenna 1010a corresponding to the NR frequency band selected from among the plurality of first antennas 1010a, 1010b, and 1010c. The second communication circuit 550 (e.g., the processor of the Wi-Fi communication module 403 of FIG. 4) may select a specific Wi-Fi frequency band and transmit the second signal, into which the second data is converted, through the fourth antenna 1020a corresponding to the Wi-Fi frequency band selected from among the plurality of second antennas 1020a and 1020b. Operations 901 and 903 of the electronic device 400 may be performed like operations 701 and 703 of the electronic device 400 as described above, and no duplicate description thereof is given below.

According to various embodiments, the antennas (e.g., the third antenna 1010a and the fourth antenna 1020a) through which the electronic device 400 transmits signals may be antennas that meet a designated condition. For example, the antennas meeting the designated condition may be antennas positioned within a designated distance. As described above in connection with FIGS. 5 to 6, the designated distance d between antennas for which the SPLS ratio is less than a threshold may be previously calculated or obtained. When the electronic device 400 transmits a signal through each of the antennas (e.g., the third antenna 1010a and the fourth antenna 1020a) within the designated distance d, since the SPLS ratio exceeds the threshold, the electronic device 400 may back off the transmission power of the signal (e.g., the second signal) transmitted through the antenna (e.g., the fourth antenna 1020a) using Wi-Fi communication.

According to various embodiments, the electronic device 400 (e.g., the processor 401 of FIG. 4 or the second processor 570 of FIG. 5) may obtain first information indicating the first frequency band associated with the third antenna from the first communication circuit 540 in operation 905. For example, the electronic device 400 (e.g., the processor 401) receives, from the first communication circuit 540, communication-associated information (e.g., at least one of information about NR frequency band or information about the communication connection state (e.g., RRC connected, RRC idle, and/or RRC inactive, or identification information about the used antenna)). Operation 905 of the electronic device 400 may be performed like operation 705 of the electronic device 400 as described above, and no duplicate description thereof is given below.

According to various embodiments, the electronic device 400 (e.g., the processor 401 of FIG. 4 or the second processor 570 of FIG. 5) may transfer the first information to the second communication circuit 550 for the second communication circuit 550 to control the upper limit of the transmission power of the second data through the fourth antenna in operation 907. For example, the electronic device 400 (e.g., the processor 401) may transfer the communication-associated information to the second communication circuit 550 (e.g., the processor of the Wi-Fi communication module 403 of FIG. 4) based on reception of the communication-associated information from the first processor 530

(e.g., the NR communication processor 402 of FIG. 4). As described above in connection with FIGS. 7, 8A, and 8B, the per-NR frequency band back-off values may previously be stored in the memory 560 referred to by the second communication circuit 550 (e.g., the processor (not shown) of the Wi-Fi communication module 403 of FIG. 4). In an embodiment, the per-NR frequency band back-off values stored in the memory 560 may be associated with some of the plurality of first antennas 1010a, 1010b, and 1010c for using NR access technology positioned in the designated distance d from at least some of the plurality of second antennas 1020a and 1020b for using Wi-Fi communication. As described above, when multiple radio access technology using the antennas positioned off the designated distance d is used, back-off may not be performed. Thus, the memory 560 may store the back-off values corresponding to some of the NR frequency bands used by some of the plurality of first antennas 1010a, 1010b, and 1010c positioned within the designated distance d from at least some of the plurality of second antennas 1020a and 1020b. As an example, referring to 1001 of FIG. 10, the back-off value for the NR frequency band used by the third antenna 1020a positioned apart from the fourth antenna 1010a by a first distance d1 in the designated distance d may be stored in the memory 560. As another example, the back-off values corresponding to the rest of the NR frequency bands used by some of the plurality of first antennas 510 positioned outside the designated distance d from at least some of the plurality of second antennas 520 may be stored in the memory 560. Referring to 1002 of FIG. 10, the back-off value for the NR frequency band used by the fifth antenna 1010b positioned apart from the fourth antenna 1020a by a second distance d2 exceeding the designated distance d may not be stored in the memory 560. For example, the NR sub6 frequency bands (band 2, band 25, band 66, and band 77) described above in connection with Table 1 may be frequency bands used by some of the plurality of first antennas 1010a, 1010b, and 1010c positioned within the designated distance d from the plurality of second antennas 1020a and 1020b.

Meanwhile, according to various embodiments, the electronic device 400 (e.g., the processor 401) may transfer communication-associated information to the second communication circuit 550 (e.g., the processor (not shown) of the Wi-Fi communication module 403 of FIG. 4) only when a back-off operation is performed. For example, the electronic device 400 (e.g., the processor 401) may transfer the communication-associated information to the second communication circuit 550 (e.g., the processor (not shown) of the Wi-Fi communication module 403 of FIG. 4) only when some of the plurality of first antennas 510 for using NR access technology positioned within the designated distance d from at least some of the plurality of second antennas 520 are used and/or the NR frequency band corresponding to some of the plurality of first antennas 510 is used. As an example, the memory 560, which may be referred to by the processor 401, may previously store information about the NR frequency bands corresponding to some of the plurality of first antennas 510 and/or information about some of the plurality of first antennas 510. Upon receiving information about the NR frequency band and/or identification information about the antenna currently used, as the received communication-associated information, if the pre-stored information includes the information about the currently used antenna and/or the information about the NR frequency band, the electronic device 400 (e.g., the processor 401) may transfer the communication-associated information to the second communication circuit 550 (e.g., the processor (not shown) of the Wi-Fi communication module 403 of FIG. 4). However, without limited to those described, the electronic device 400 (e.g., the processor 401) may transfer the communication-associated information to the second communication circuit 550 (e.g., the processor (not shown) of the Wi-Fi communication module 403 of FIG. 4) based on reception of the communication-associated information from the first processor 530 (e.g., the NR communication processor 402 of FIG. 4).

An example of an operation of an electronic device 400 is described below according to various embodiments.

According to various embodiments, the electronic device 400 (e.g., the processor 401) may perform the operation of backing off the transmission power for Wi-Fi communication based on the information about the currently used antenna.

Figure 11:
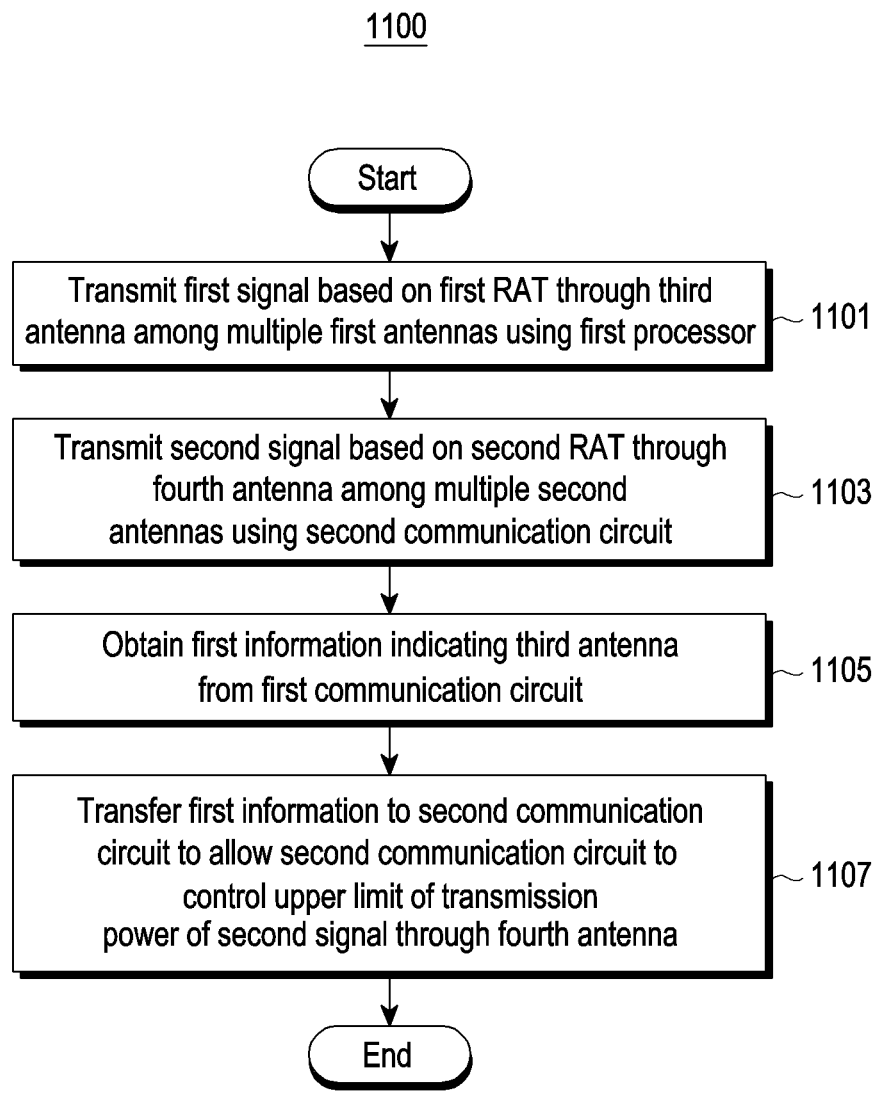
FIG. 11 is a flowchart illustrating an example of an operation of an electronic device according to an embodiment of the disclosure.

FIG. 11 is a flowchart 1100 illustrating an example of an operation of an electronic device 400 according to an embodiment of the disclosure.

Referring to FIG. 11, the operations are not limited to the shown order but may rather be performed in other various orders. According to various embodiments, more or less operations than those of FIG. 11 may be performed.

According to various embodiments, in operation 1101, the electronic device 400 (e.g., the processor 401 of FIG. 4) may transmit a first signal based on a first RAT through a third antenna among the plurality of first antennas 510 using the first processor 530 and, in operation 1103, transmit a second signal based on a second RAT through a fourth antenna among the plurality of second antennas 520 using the second communication circuit 550. For example, in the case of using multiple radio access technology using NR access technology and Wi-Fi communication, the electronic device 400 (e.g., the processor 401) may transfer first data to the first processor 530 (e.g., the NR communication processor 402 of FIG. 4) and second data to the second communication circuit 550 (e.g., the processor (not shown) of the Wi-Fi communication module 403 of FIG. 4). The first processor 530 (e.g., the NR communication processor 402 of FIG. 4) may select a specific NR frequency band and transmit the first signal, into which the first data is converted, through the third antenna corresponding to the selected NR frequency band. The second communication circuit 550 (e.g., the processor (not shown) of the Wi-Fi communication module 403 of FIG. 4) may select a specific Wi-Fi frequency band and transmit the second signal, into which the second data is converted, through the fourth antenna corresponding to the selected Wi-Fi frequency band. Operations 1101 and 1103 of the electronic device 400 may be performed like operations 903 and 905 of the electronic device 400 as described above, and no duplicate description thereof is given below.

According to various embodiments, the electronic device 400 (e.g., the processor 401 of FIG. 4 or the second processor 570 of FIG. 5) may obtain first information indicating the third antenna from the first communication circuit 540 in operation 1105. For example, the electronic device 400 (e.g., the processor 401) may obtain information indicating the antenna currently selected for NR access technology-based communication. As an example, the electronic device 400 (e.g., the processor 401) may receive identification information (or config information) about the used antenna, as the communication-associated information, from the first communication circuit 540 (e.g., the communication processor 401). As another example, the electronic device 400 (e.g., the processor 401) may receive the information about the used NR frequency band, as the communication-associated information, and obtain the identification information (or config information) about the antenna corresponding to the NR frequency band based on the received information about the antenna for each NR frequency band previously stored in the memory 560. Operation 1105 of the electronic device 400 may be performed like operation 705 of the electronic device 400 as described above, and no duplicate description thereof is given below.

According to various embodiments, the electronic device 400 (e.g., the processor 401 of FIG. 4 or the second processor 570 of FIG. 5) may transfer the first information to the second communication circuit 550 for the second communication circuit 550 to control the upper limit of the transmission power of the second data through the fourth antenna in operation 1107. For example, the electronic device 400 (e.g., the processor 401) may transfer the communication-associated information to the second communication circuit 550 (e.g., the processor (not shown) of the Wi-Fi communication module 403 of FIG. 4) based on obtaining the information indicating the antenna (e.g., the third antenna) currently selected for NR access technology-based communication as described above. The memory 560, which is referred to by the second communication circuit 550 (e.g., the processor (not shown) of the Wi-Fi communication module 403 of FIG. 4), may previously store per-identification information back-off values of some of the plurality of first antennas 510, similarly to previously storing the per-NR frequency band back-off values in FIGS. 7, 8A, and 8B. For example, back-off values may previously be stored per antenna identification information. In this case, each of the back-off values may correspond to a respective one of the Wi-Fi communication schemes (e.g., 2G Wi-Fi, 5G Wi-Fi, 2G real simultaneous dual band (rsdb) Wi-Fi, 5G rsdb Wi-Fi schemes). Accordingly, the second communication circuit 550 (e.g., the processor (not shown) of the Wi-Fi communication module 403 of FIG. 4) may identify the back-off value corresponding to the used Wi-Fi communication scheme and the antenna identification information received from the memory 560 and back off the transmission power for transmission of the second signal based on the identified back-off value. The back-off operation may be performed like operation 707 of the electronic device 400, and no duplicate description thereof is given below. In this case, some of the plurality of first antennas 510 for which the back-off values are stored in the memory 560 may be antennas positioned within the designated distance d from at least some of the plurality of second antennas 520.

An example of operations of the electronic device 400 (e.g., the Wi-Fi communication module 403 of FIG. 4) is described below according to various embodiments.

According to various embodiments, the electronic device 400 (e.g., the Wi-Fi communication module 403) may perform different back-off operations depending on whether the memory 560 includes the back-off value corresponding to the currently received communication-associated information (e.g., information about NR frequency band and/or antenna identification information).

Figure 12:
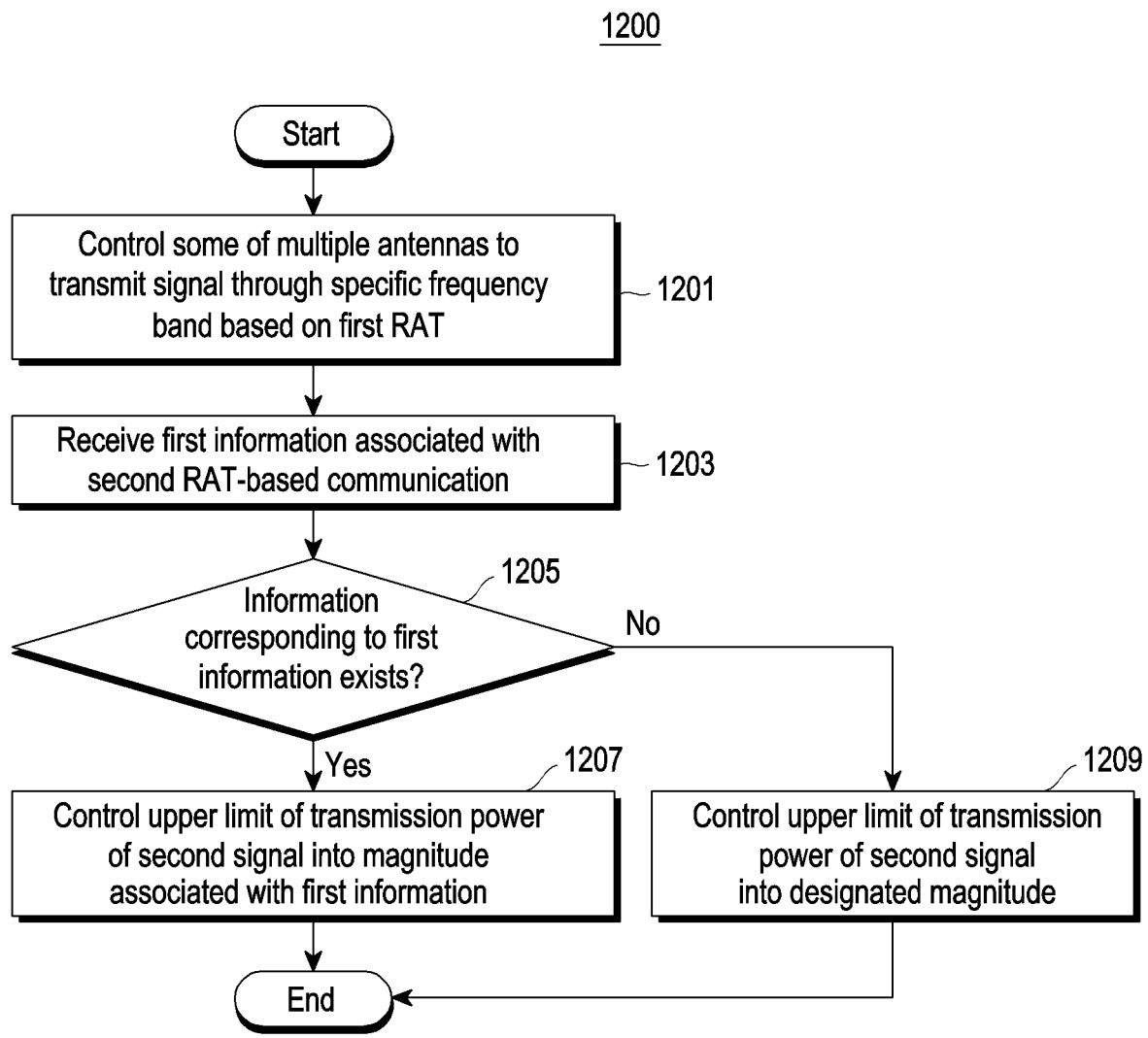
FIG. 12 is a flowchart illustrating an example of an operation of an electronic device according to an embodiment of the disclosure.

FIG. 12 is a flowchart 1200 illustrating an example of an operation of an electronic device 400 according to an embodiment of the disclosure.

Referring to FIG. 12, the operations are not limited to the shown order but may rather be performed in other various orders. According to various embodiments, more or less operations than those of FIG. 12 may be performed.

According to various embodiments, the electronic device 400 (e.g., the Wi-Fi communication module 403) may control some of the plurality of antennas to transmit signals through a specific frequency band based on the first RAT in operation 1201. For example, the Wi-Fi communication module 403 may receive data from the processor 401, convert the received data into a signal, and transmit the converted signal through an antenna selected from among the plurality of second antennas 520 for Wi-Fi communication.

According to various embodiments, the electronic device 400 (e.g., the Wi-Fi communication module 403) may receive first information associated with second RAT-based communication in operation 1203 and determine whether the memory 560 includes information corresponding to the first information in operation 1205. For example, the Wi-Fi communication module 403 may receive, from the processor 401, communication-associated information (e.g., at least one of the information about the NR frequency band used for signal transmission or antenna identification information). The Wi-Fi communication module 403 may determine whether there is a back-off value corresponding to the currently received communication-associated information (e.g., at least one of the information about the NR frequency band used for signal transmission or antenna identification information) by referring to the back-off value per communication-associated information (e.g., at least one of the information about the NR frequency band used for signal transmission or antenna identification information) pre-stored in the memory 560.

According to various embodiments, when there is information corresponding to the first information, the electronic device 400 (e.g., the Wi-Fi communication module 403) may control the upper limit of transmission power of the second signal to a magnitude associated with the first information in operation 1207 and, if there is no information corresponding to the first information, control the upper limit of transmission power of the second signal to a designated magnitude in operation 1209. For example, upon identifying the back-off value corresponding to the currently received communication-associated information (e.g., at least one of the information about the NR frequency band used for signal transmission or antenna identification information), the Wi-Fi communication module 403 may reduce the upper limit of transmission power by a value obtained by adding the identified back-off value to the designated back-off value. As another example, the Wi-Fi communication module 403 may reduce the upper limit of transmission power by the designated back-off value if no back-off value corresponding to the currently received communication-associated information (e.g., at least one of the information about the NR frequency band used for signal transmission or antenna identification information) is identified.

An example of operations of an electronic device 400 (e.g., user equipment (UE)) is described below according to various embodiments.

According to various embodiments, if NR radio access technology-based communication is performed while Wi-Fi communication is performed, the electronic device 400 may identify an occurrence of an event of using multiple radio access technology, receive communication-associated information from the first processor 530 (e.g., the NR communication processor 402 of FIG. 4), and transfer it to the second communication circuit 550 (e.g., the processor (not shown) of the Wi-Fi communication module 403 of FIG. 4). If the NR radio access technology-based communication is terminated, the electronic device 400 may transfer information indicating the termination to the second communication circuit 550 (e.g., the processor (not shown) of the Wi-Fi communication module 403 of FIG. 4) to stop the back-off operation.

Figure 13:
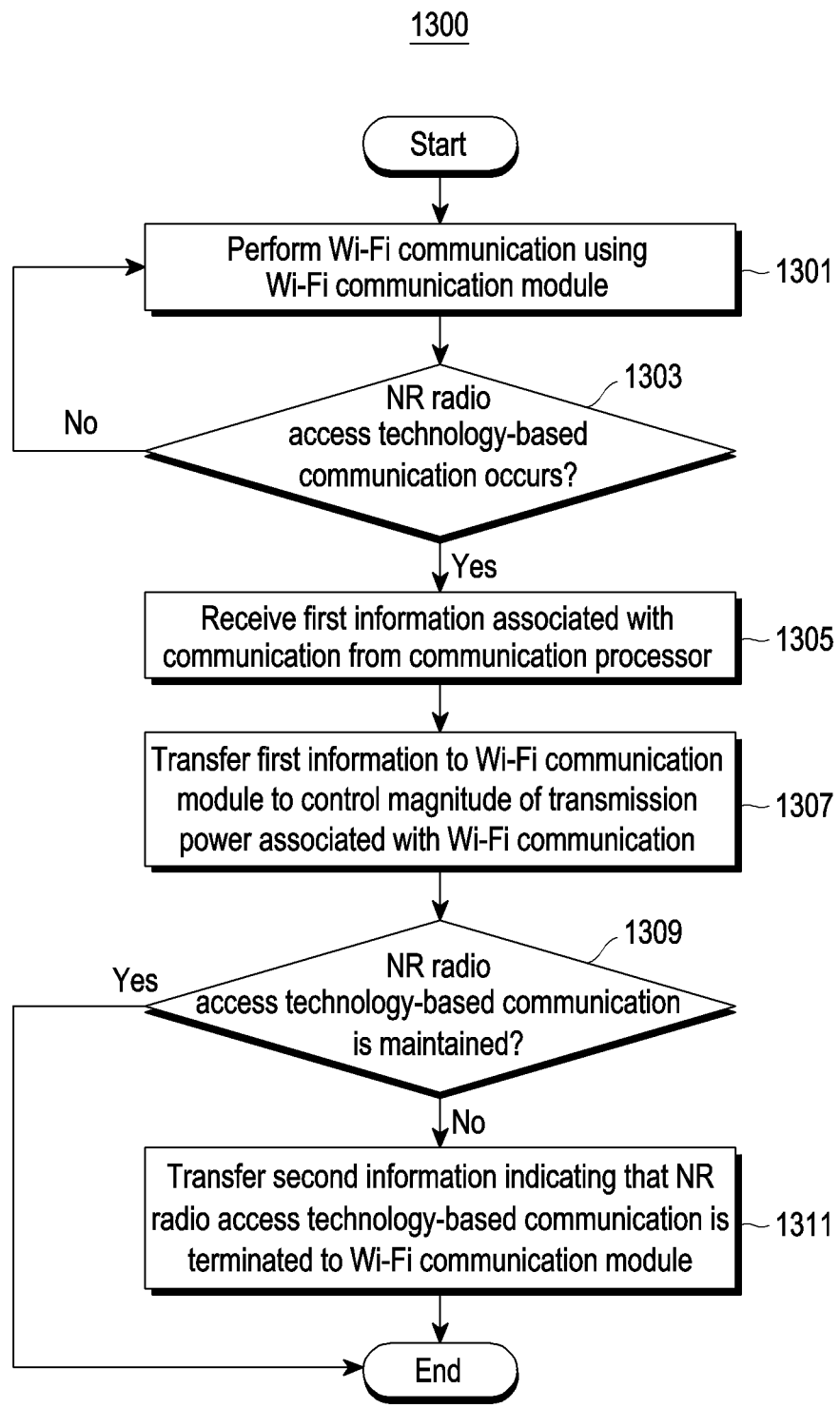
FIG. 13 is a flowchart illustrating an example of an operation of an electronic device according to an embodiment of the disclosure.

FIG. 13 is a flowchart 1300 illustrating an example of an operation of an electronic device 400 according to an embodiment of the disclosure.

Referring to FIG. 13, the operations are not limited to the shown order but may rather be performed in other various orders. According to various embodiments, more or less operations than those of FIG. 13 may be performed.

According to various embodiments, in operation 1301, the electronic device 400 (e.g., the processor 401 of FIG. 4 or the second processor 570 of FIG. 5) may perform Wi-Fi communication using the Wi-Fi communication module 403. For example, the electronic device 400 (e.g., the processor 401) may transfer data to be transmitted for Wi-Fi communication-based communication to the second communication circuit 550 (e.g., the processor (not shown) of the Wi-Fi communication module 403 of FIG. 4). The second communication circuit 550 (e.g., the processor (not shown) of the Wi-Fi communication module 403 of FIG. 4) may identify a frequency band for Wi-Fi communication and transmit the signal corresponding to data using the antenna selected from among the plurality of second antennas 520 through the identified frequency band. Operation 1301 of the electronic device 400 may be performed like operation of the Wi-Fi communication module 403 in operation 701 of the electronic device 400 as described above, and no duplicate description thereof is given below.

According to various embodiments, the electronic device 400 (e.g., the processor 401 of FIG. 4 or the second processor 570 of FIG. 5) may determine whether NR radio access technology-based communication occurs while Wi-Fi communication is performed, in operation 1303. For example, the electronic device 400 may determine whether NR access technology-based communication occurs while transmitting the signal corresponding to data using the antenna selected from among the plurality of second antennas 520 through the identified frequency band based on Wi-Fi communication. As an example, the electronic device 400 may identify whether to activate the mobile hotspot function while performing Wi-Fi communication. As another example, the electronic device 400 may identify whether an NR access technology-based call is received during Wi-Fi communication.

Meanwhile, without limited to those described and/or shown, according to various embodiments, the electronic device 400 may determine whether Wi-Fi communication occurs while performing NR radio access technology-based communication using the first processor 530 (e.g., the NR communication processor 402 of FIG. 4).

According to various embodiments, when NR radio access technology-based communication occurs, the electronic device 400 (e.g., the processor 401 of FIG. 4 or the second processor 570 of FIG. 5) may receive first information associated with communication from the communication processor 401 in operation 1305 and, in operation 1307, transfer the first information to the Wi-Fi communication module 403 to control the magnitude of the transmission power associated with Wi-Fi communication. For example, when NR access technology-based communication occurs, the electronic device 400 (e.g., the processor 401) may receive allocation information (e.g., information about the used NR frequency band or antenna identification information) from the first processor 530 (e.g., the NR communication processor 402 of FIG. 4) and transfer the received communication-associated information to the Wi-Fi communication module 403. The Wi-Fi communication module 403 may reduce or maintain the upper limit of transmission power (e.g., the transmission power of the second signal) for Wi-Fi communication based on the per-communication-associated information back-off values pre-stored in the memory 560 and the received communication-associated information. The back-off operation of transmission power for Wi-Fi communication may be performed like operation 707 of the electronic device 400 as described above, and no duplicate description thereof is given below.

According to various embodiments, if NR radio access technology-based communication is not performed, the electronic device 400 may perform Wi-Fi communication continuously using the Wi-Fi communication module 403. For example, the electronic device 400 (e.g., the Wi-Fi communication module 403) may maintain the upper limit of transmission power for Wi-Fi communication.

Meanwhile, without limited to those described and/or shown, according to various embodiments, if an occurrence of Wi-Fi communication is identified, the electronic device 400 (e.g., the processor 401) may receive communication-associated information (e.g., the information about the used NR frequency band or antenna identification information) and transfer it to the Wi-Fi communication module 403. In this case, the electronic device 400 (e.g., the processor 401) may send a request for communication-associated information to the communication processor 401 based on identifying an event of using multiple radio access technology according to the occurrence of Wi-Fi communication and receive the information.

According to various embodiments, the electronic device 400 (e.g., the processor 401 of FIG. 4 or the second processor 570 of FIG. 5) may determine whether the NR radio access technology-based communication is maintained in operation 1309. If the NR radio access technology-based communication is terminated, the electronic device 400 (e.g., the processor 401 of FIG. 4 or the second processor 570 of FIG. 5) may transfer second information indicating the termination of the NR radio access technology-based communication to the Wi-Fi communication module 403 in operation 1311.

In an embodiment, the electronic device 400 (e.g., the processor 401 of FIG. 4 or the second processor 570 of FIG. 5) may determine whether the activated mobile hotspot function or received NR radio access technology-based call is maintained as at least part of determining whether the NR radio access technology-based call is maintained. For example, if the activated mobile hotspot function is deactivated or the received NR radio access technology-based call is terminated, the electronic device 400 (e.g., the processor 401) may receive second information indicating the deactivation or the termination from the communication processor 401. As another example, if the activated mobile hotspot function is deactivated or the received NR radio access technology-based call is terminated, the electronic device 400 (e.g., the processor 401) itself may obtain second information indicating the deactivation or the termination. Upon obtaining the second information indicating the deactivation or the termination, the electronic device 400 may determine that the NR radio access technology-based communication is terminated. The electronic device 400 (e.g., the processor 401) may allow the Wi-Fi communication module 403 to stop the back-off operation or change the magnitude of the back-off operation transmission power to the prior upper limit of transmission power based on determining that the NR radio access technology-based call is terminated. Thus, as an example, the electronic device 400

(e.g., the processor 401) may transfer the second information to the Wi-Fi communication module 403, and the Wi-Fi communication module 403 may stop the back-off operation and change the magnitude of the back-off operation transmission power to the upper limit of transmission power before performing the back-off operation based on receiving the second information.

In another embodiment, the electronic device 400 (e.g., the processor 401 of FIG. 4 or the second processor 570 of FIG. 5) may determine whether the current RRC state is the connected state based on the information about the communication state (e.g., information about the RRC state) received from the communication processor 401 as at least part of determining whether the NR radio access technology-based communication is maintained. Unless the current RRC state is the connected state (or if it is the idle state or inactive state), the electronic device 400 may receive second information indicating the deactivation or the termination from the communication processor 401.

According to various embodiments, if the NR radio access technology-based communication is not terminated (or maintained), the electronic device 400 (e.g., the processor 401 of FIG. 4 or the second processor 570 of FIG. 5) may maintain the NR radio access technology-based communication and Wi-Fi communication in a state in which the upper limit of transmission power for Wi-Fi communication is continuously controlled.

An example of operations of an electronic device 400 (e.g., user equipment (UE)) is described below according to various embodiments.

According to various embodiments, when the information associated with the NR radio access technology-based communication is changed, the electronic device 400 may transfer the changed information to the second communication circuit 550 (e.g., the processor (not shown) of the Wi-Fi communication module 403 of FIG. 4).

Figure 14:
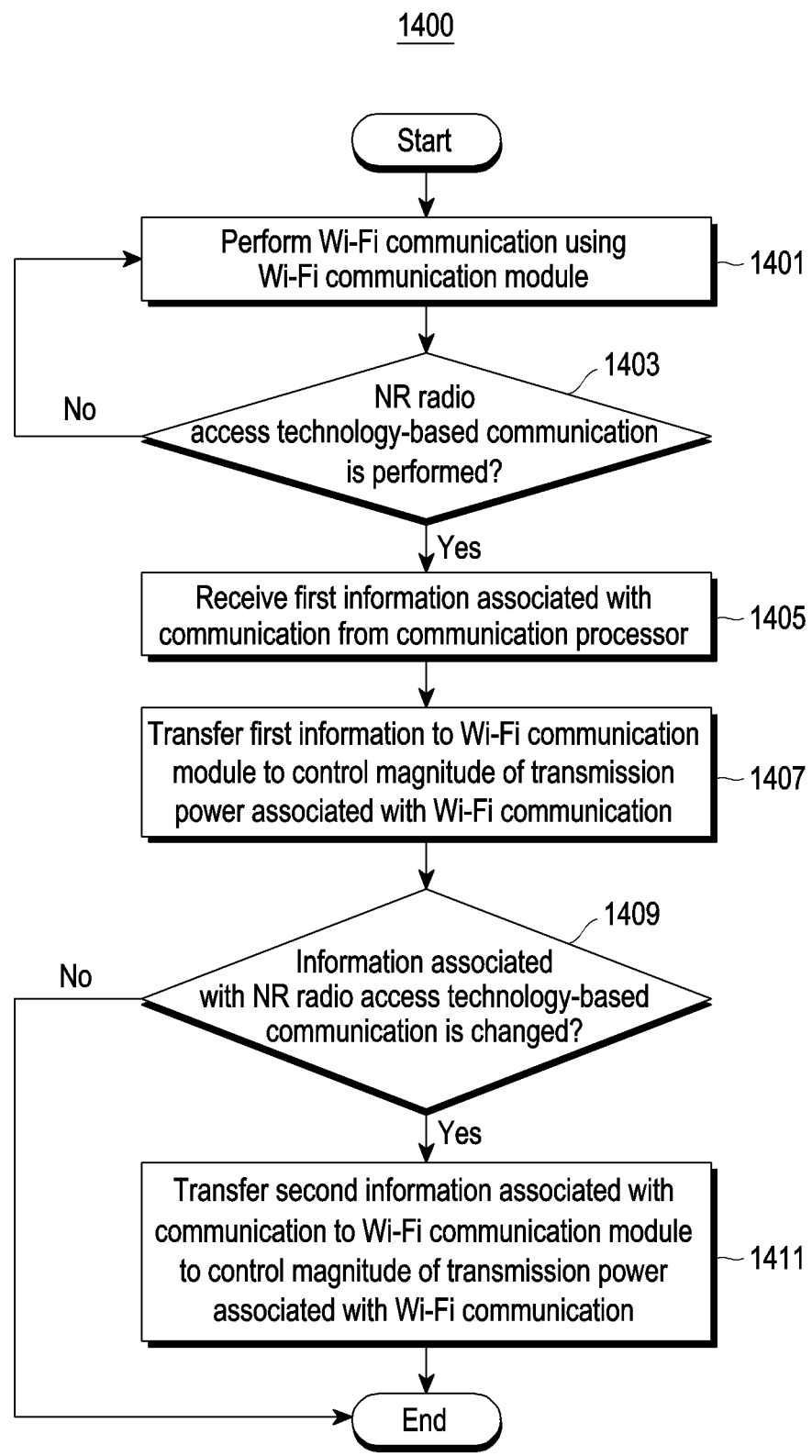
FIG. 14 is a flowchart illustrating an example of an operation of an electronic device according to an embodiment of the disclosure.

FIG. 14 is a flowchart 1400 illustrating an example of an operation of an electronic device 400 according to an embodiment of the disclosure.

Referring to FIG. 14, the operations are not limited to the shown order but may rather be performed in other various orders. According to various embodiments, more or less operations than those of FIG. 14 may be performed.

According to various embodiments, in operation 1401, the electronic device 400 (e.g., the processor 401 of FIG. 4 or the second processor 570 of FIG. 5) may perform Wi-Fi communication using the Wi-Fi communication module 403. For example, the electronic device 400 (e.g., the processor 401) may transfer data to be transmitted for Wi-Fi communication-based communication to the second communication circuit 550 (e.g., the processor (not shown) of the Wi-Fi communication module 403 of FIG. 4). The second communication circuit 550 (e.g., the processor (not shown) of the Wi-Fi communication module 403 of FIG. 4) may identify a frequency band for Wi-Fi communication and transmit the signal corresponding to data using the antenna selected from among the plurality of second antennas 520 through the identified frequency band. Operation 1401 of the electronic device 400 may be performed like operation of the Wi-Fi communication module 403 in operation 701 of the electronic device 400 as described above, and no duplicate description thereof is given below.

According to various embodiments, the electronic device 400 (e.g., the processor 401 of FIG. 4 or the second processor 570 of FIG. 5) may determine whether NR radio access technology-based communication occurs while Wi-Fi communication is performed, in operation 1403. For example, the electronic device 400 may determine whether NR access technology-based communication occurs while transmitting the signal corresponding to data using the antenna selected from among the plurality of second antennas 520 through the identified frequency band based on Wi-Fi communication. As an example, the electronic device 400 may identify whether to activate the mobile hotspot function while performing Wi-Fi communication. As another example, the electronic device 400 may identify whether an NR access technology-based call is received during Wi-Fi communication.

According to various embodiments, when NR radio access technology-based communication occurs, the electronic device 400 (e.g., the processor 401 of FIG. 4 or the second processor 570 of FIG. 5) may receive first information associated with communication from the communication processor 401 in operation 1405 and, in operation 1407, transfer the first information to the Wi-Fi communication module 403 to control the magnitude of the transmission power associated with Wi-Fi communication. For example, when NR access technology-based communication occurs, the electronic device 400 (e.g., the processor 401) may receive allocation information (e.g., information about the used NR frequency band or antenna identification information) from the first processor 530 (e.g., the NR communication processor 402 of FIG. 4) and transfer the received communication-associated information to the Wi-Fi communication module 403. The Wi-Fi communication module 403 may reduce or maintain the upper limit of transmission power (e.g., the transmission power of the second signal) for Wi-Fi communication based on the per-communication-associated information back-off values pre-stored in the memory 560 and the received communication-associated information. The back-off operation of transmission power for Wi-Fi communication may be performed like operation 707 of the electronic device 400 as described above, and no duplicate description thereof is given below.

According to various embodiments, when NR radio access technology-based communication is not performed, the electronic device 400 (e.g., the processor 401 of FIG. 4 or the second processor 570 of FIG. 5) may continuously perform Wi-Fi communication using the Wi-Fi communication module 403. For example, the electronic device 400 (e.g., the Wi-Fi communication module 403) may maintain the upper limit of transmission power for Wi-Fi communication.

According to various embodiments, the electronic device 400 (e.g., the processor 401 of FIG. 4 or the second processor 570 of FIG. 5) may determine whether NR radio access technology-based communication is changed in operation 1409. According to an embodiment, if the communication-associated information (e.g., at least one of information about the NR frequency band, information about the used antenna, or information about the communication connection state) is changed, the communication processor 401 may transfer the changed communication-associated information to the processor 401. The processor 401 may determine whether the communication-associated information is changed based on receiving the changed communication-associated information. As an example, as the electronic device 400 moves to another cell so that handover occurs, at least one of information about the NR frequency band, information about the used antenna, or information about the communication connection state may be changed based on a negotiation between the electronic device 400 and the other cell. For example, as the used NR frequency band is changed based on the negotiation (e.g., frequency resource allocation) with the network, the used antenna may be changed as well. Or, without limited to those described, upon performing an RRC connection reestablishment procedure or upon uploading in the RRC connected state, a least one of information about the NR frequency band, information about the used antenna, or information about the communication connection state may be changed according to the RRC RACH. In this case, the communication processor 401 may transfer the changed NR frequency band information and/or antenna identification information to the processor 401.

According to various embodiments, the electronic device 400 (e.g., the processor 401 of FIG. 4 or the second processor 570 of FIG. 5) may transfer communication-associated second information to the Wi-Fi communication module 403 to control the magnitude of transmission power associated with Wi-Fi communication in operation 1411. For example, the processor 401 may transfer the received, changed communication-associated information to the Wi-Fi communication module 403. The Wi-Fi communication module 403 may reduce the upper limit of transmission power by the back-off value corresponding to the changed communication-associated information. Accordingly, if the communication-associated information associated with NR radio access technology is changed, the Wi-Fi communication module 403 may dynamically control the upper limit of transmission power.

An example of operations of an electronic device 400 (e.g., user equipment (UE)) is described below according to various embodiments.

According to various embodiments, if multiple radio access technology based on NR radio access technology and Wi-Fi communication is used or NR radio access technology-based communication-associated information is changed while multiple radio access technology is used, the electronic device 400 (e.g., the NR communication processor 401 of FIG. 4) may receive communication-associated information (e.g., the information about the NR frequency band or information about the used antenna) from the communication processor 401 and transfer it to the Wi-Fi communication module 403. In this case, the communication processor 401 may transfer the communication-associated information to the Wi-Fi communication module 403 through the processor 401 at the time of identifying that the RRC state is changed to the RRC connected state due to use of multiple radio access technology (or within a designated period from the time). Alternatively, the communication processor 401 may transfer the communication-associated information to the Wi-Fi communication module 403 through the processor 401 at the time of identifying that the communication connection state is changed from the RRC idle state to the RRC connected state (or within the designated period from the time).

Figure 15A:
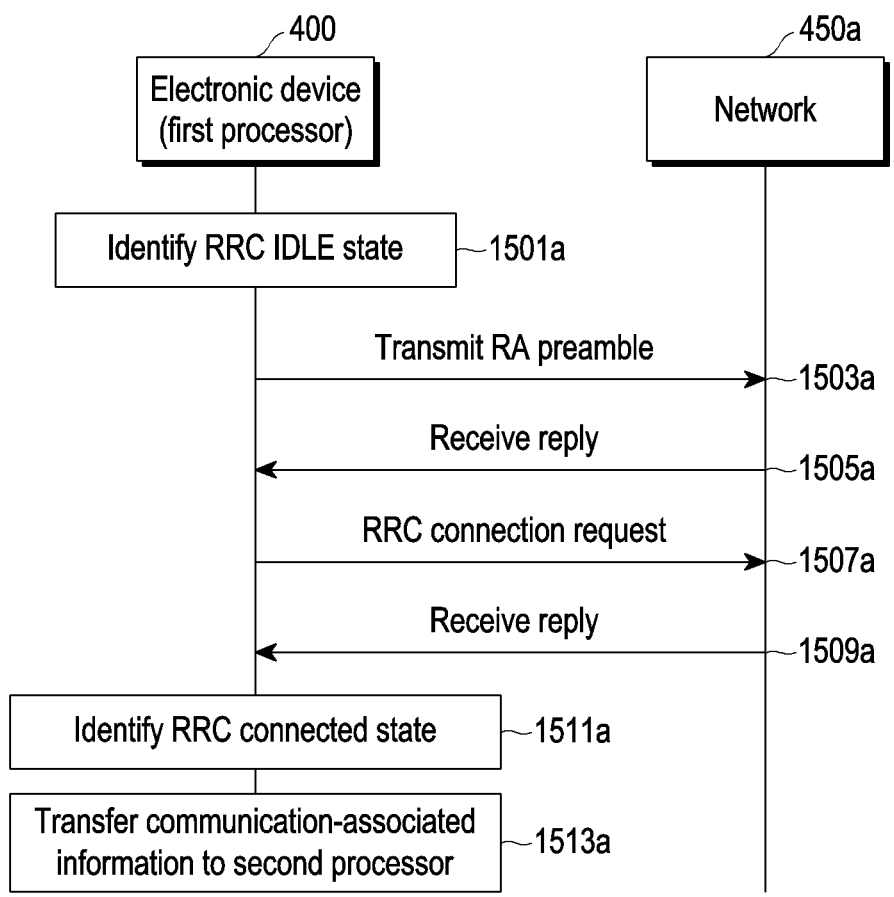
FIG. 15A is a flowchart illustrating an example of an operation of an electronic device according to an embodiment of the disclosure.

FIG. 15A is a flowchart 1500a illustrating an example of an operation of an electronic device 400 according to an embodiment of the disclosure.

Referring to FIG. 15A, the operations are not limited to the shown order but may rather be performed in other various orders. According to various embodiments, more or less operations than those of FIG. 15A may be performed.

According to various embodiments, the electronic device 400 (e.g., the NR communication processor 401) may identify the RRC idle state in operation 1501a.

According to various embodiments, the electronic device 400 (e.g., the NR communication processor 401) may transmit an RA preamble to the network (e.g., a base station (e.g., the LTE base station of FIGS. 3A and 3C or the NR base station of FIG. 3B)) in operation 1503a and, in operation 1505a, receive a reply to the RA preamble (random access preamble) from the network.

According to various embodiments, in operation 1507a, the electronic device 400 (e.g., the NR communication processor 401) may transmit a signal for request for RRC connection to the network (e.g., a base station (e.g., the LTE base station of FIGS. 3A and 3C or the NR base station of FIG. 3B)) based on receiving the reply to the RA preamble and, in operation 1509a, receive a response (e.g., an RRC connection setup message) to the request.

According to various embodiments, the electronic device 400 (e.g., the NR communication processor 401) may identify the RRC connected state in operation 1511a and, in operation 1513a, transfer communication-associated information (e.g., information about the NR frequency band and/or antenna identification information) to the processor 401.

Or, without limited to those described and/or shown, according to various embodiments, the electronic device 400 (e.g., the communication processor 401) may transfer the communication-associated information to the Wi-Fi communication module 403 through the processor 401 when changed to the RRC connected state, based on receiving a paging from the network (e.g., a base station) in the RRC inactive state.

An example of an operation of an electronic device 400 is described below according to various embodiments.

According to various embodiments, the electronic device 400 (e.g., the NR communication processor 401 of FIG. 4) may transfer the communication-associated information to the Wi-Fi communication module 403 through the processor 401 at the time of identifying that a signal is transmitted to the network based on NR access technology. For example, when the RRC state is the IDLE state, the electronic device 400 may identify that RRC connection is transmitted according to the reception of the RRC preamble and, based thereupon, transfer communication-associated information to the Wi-Fi communication module 403 through the processor 401 to back off the transmission power for Wi-Fi communication.

Figure 15B:
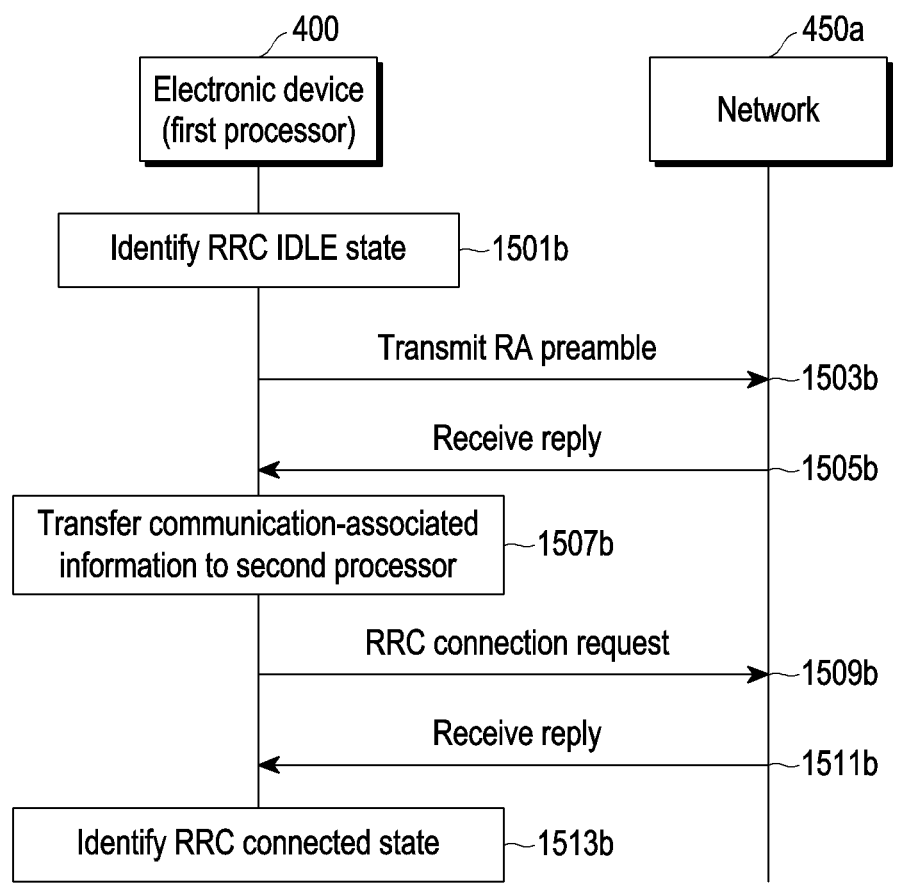
FIG. 15B is a flowchart illustrating an example of an operation of an electronic device according to an embodiment of the disclosure.

FIG. 15B is a flowchart 1500b illustrating another example of an operation of an electronic device 400 according to an embodiment of the disclosure.

Referring to FIG. 15B, the operations are not limited to the shown order but may rather be performed in other various orders. According to various embodiments, more or less operations than those of FIG. 15B may be performed.

According to various embodiments, the electronic device 400 (e.g., the NR communication processor 401) may identify the RRC idle state in operation 1501b.

According to various embodiments, the electronic device 400 (e.g., the NR communication processor 401) may transmit an RA preamble to the network (e.g., a base station (e.g., the LTE base station of FIGS. 3A and 3C or the NR base station of FIG. 3B)) in operation 1503b and, in operation 1505b, receive a reply to the RA preamble (random access preamble) from the network.

According to various embodiments, in operation 1507b, the electronic device 400 (e.g., the NR communication processor 401) may transfer communication-associated information (e.g., information about the NR frequency band and/or antenna identification information) to the processor 401 based on receiving the reply to the RA preamble.

According to various embodiments, in operation 1509b, the electronic device 400 (e.g., the NR communication processor 401) may transmit a signal for request for RRC connection to the network (e.g., a base station (e.g., the LTE base station of FIGS. 3A and 3C or the NR base station of FIG. 3B)) and, in operation 1511b, receive a response (e.g., an RRC connection setup message) to the request.

According to various embodiments, the electronic device 400 (e.g., the NR communication processor 401) may identify the RRC connected state in operation 1513b.

An example of an operation of an electronic device 400 is described below according to various embodiments.

According to various embodiments, the electronic device 400 may perform a back-off operation based on the information about the RRC state together with the information about the NR frequency band.

Figure 16:
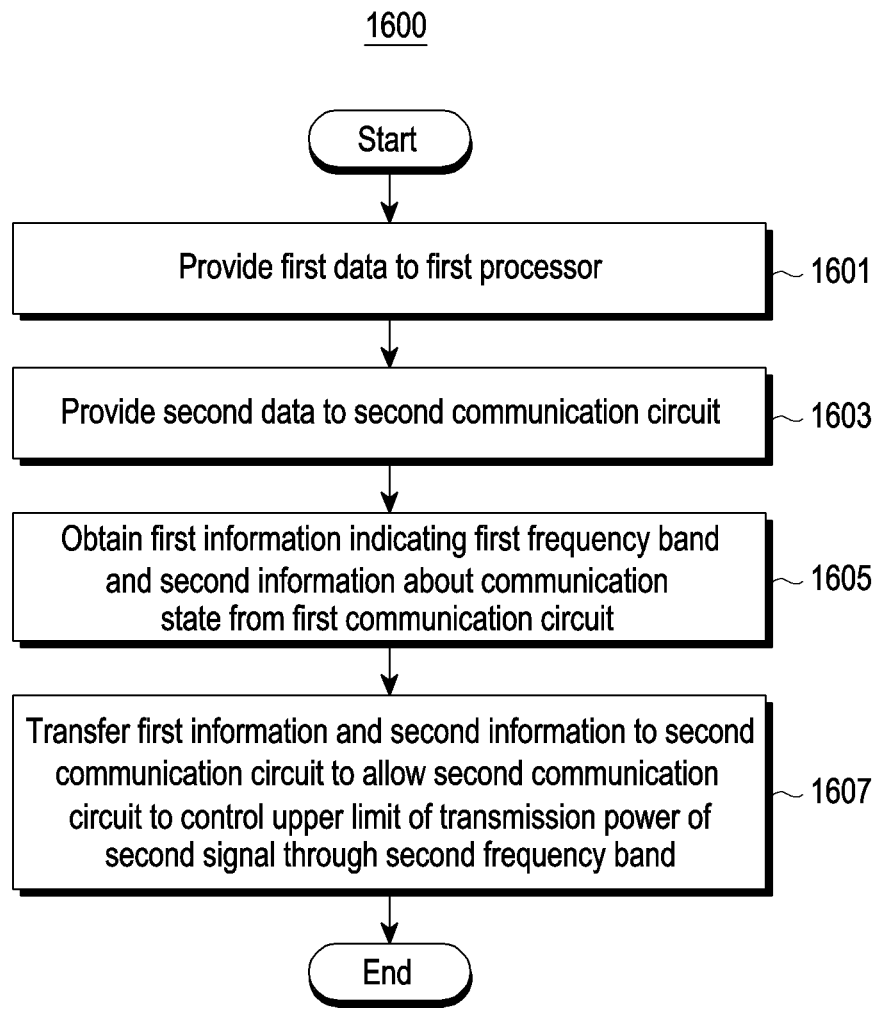
FIG. 16 is a flowchart illustrating an example of an operation of an electronic device according to an embodiment of the disclosure.

FIG. 16 is a flowchart 1600 illustrating an example of an operation of an electronic device 400 according to an embodiment of the disclosure.

Referring to FIG. 16, the operations are not limited to the shown order but may rather be performed in other various orders. According to various embodiments, more or less operations than those of FIG. 16 may be performed.

Figure 17:
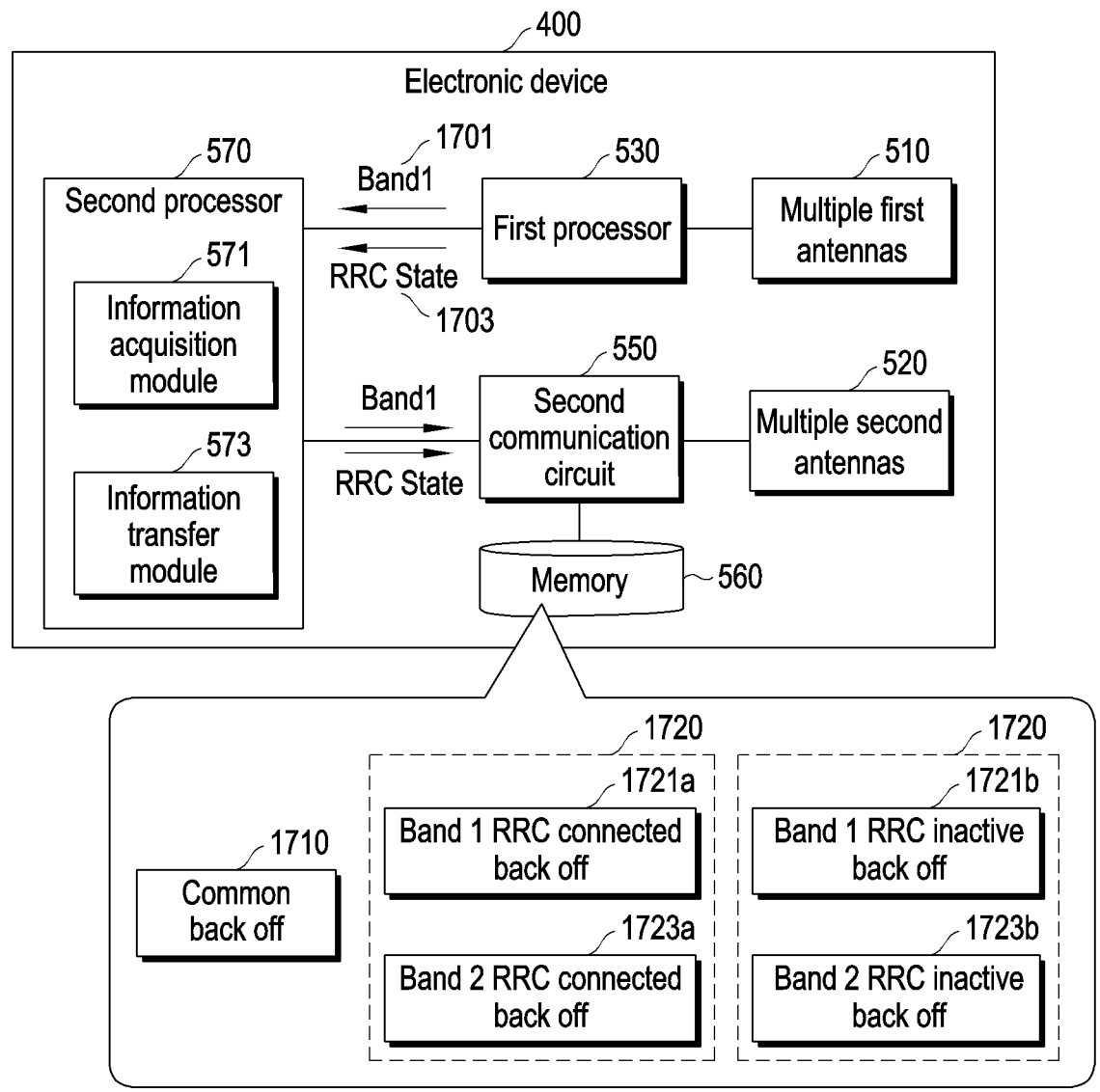
FIG. 17 is a view illustrating an operation of identifying a back-off value for each NR frequency band and each radio resource control (RRC) state of another electronic device according to an embodiment of the disclosure.
Figure 18A:
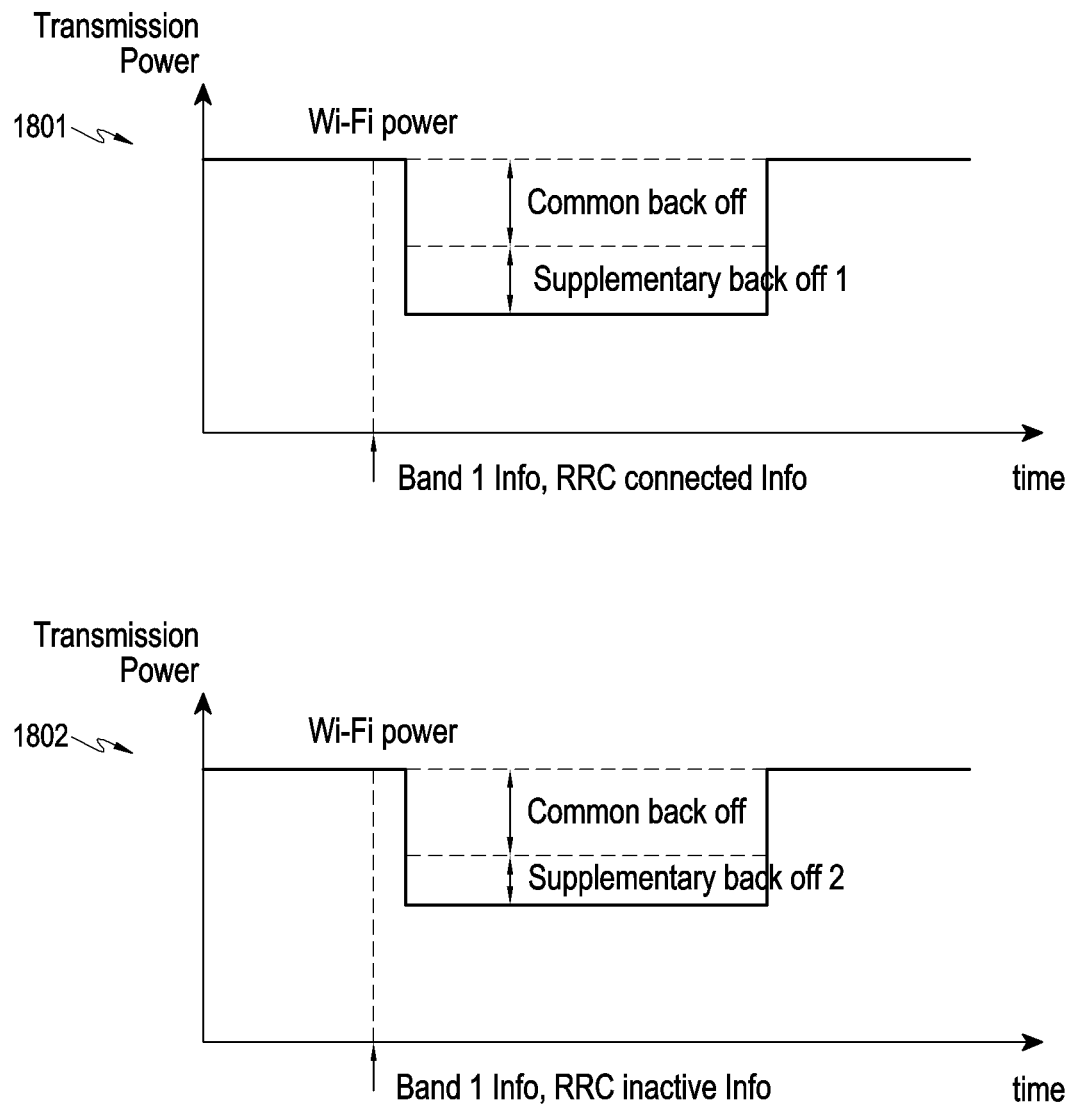
FIG. 18A is a view illustrating an example of an operation of backing off transmission power for Wi-Fi communication according to an RRC state of an electronic device according to an embodiment of the disclosure.
Figure 18B:
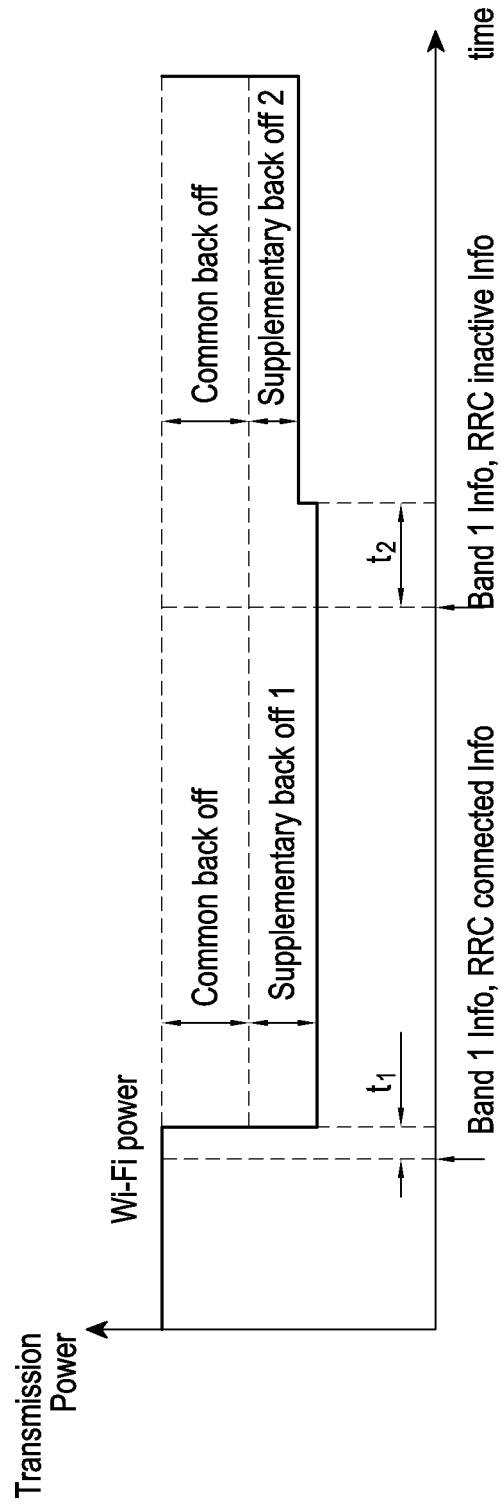
FIG. 18B is a view illustrating an example of an operation of backing off transmission power for Wi-Fi communication when an RRC state of an electronic device is changed according to an embodiment of the disclosure.
Figure 19A:
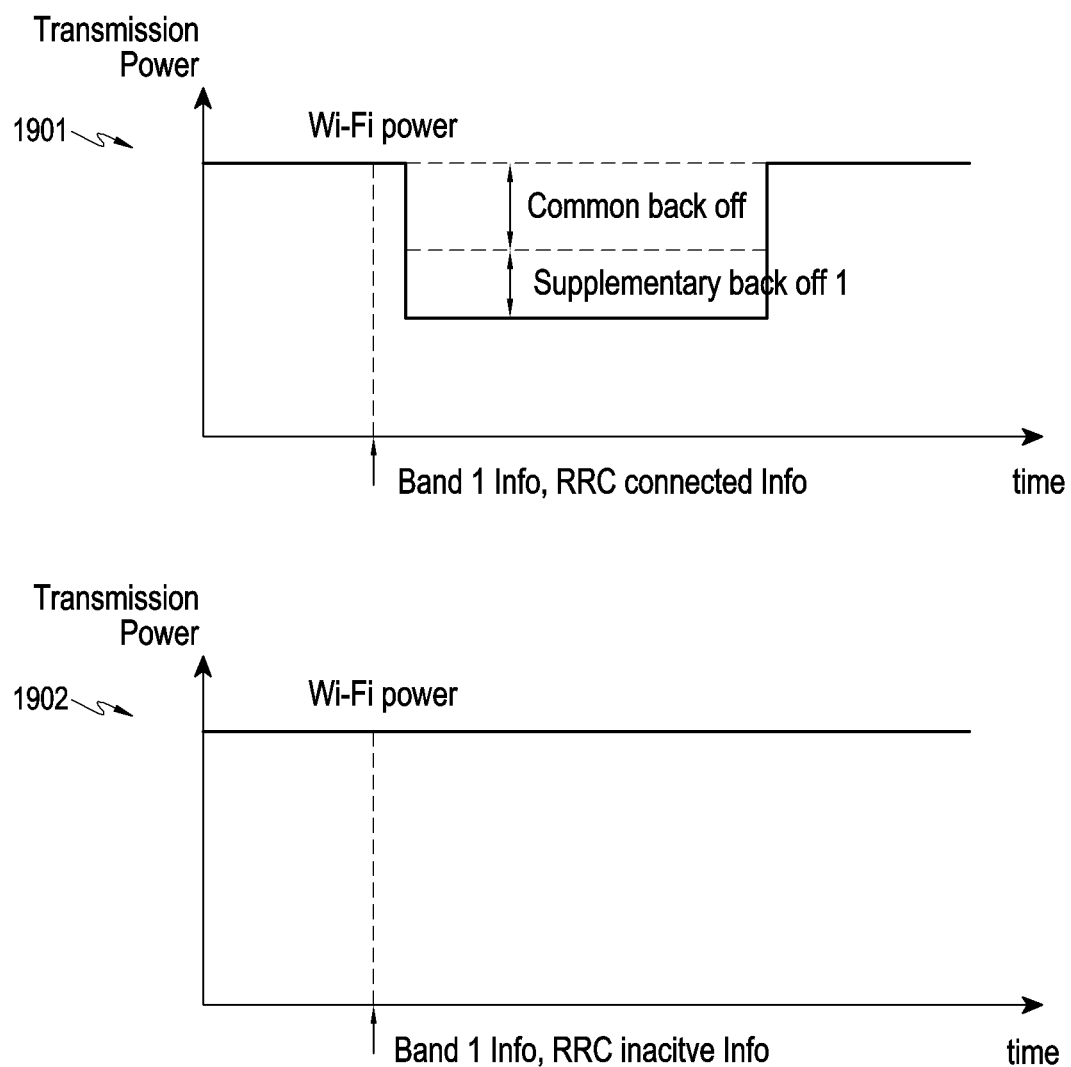
FIG. 19A is a view illustrating another example of an operation of backing off transmission power for Wi-Fi communication according to an RRC state of an electronic device according to an embodiment of the disclosure.
Figure 19B:
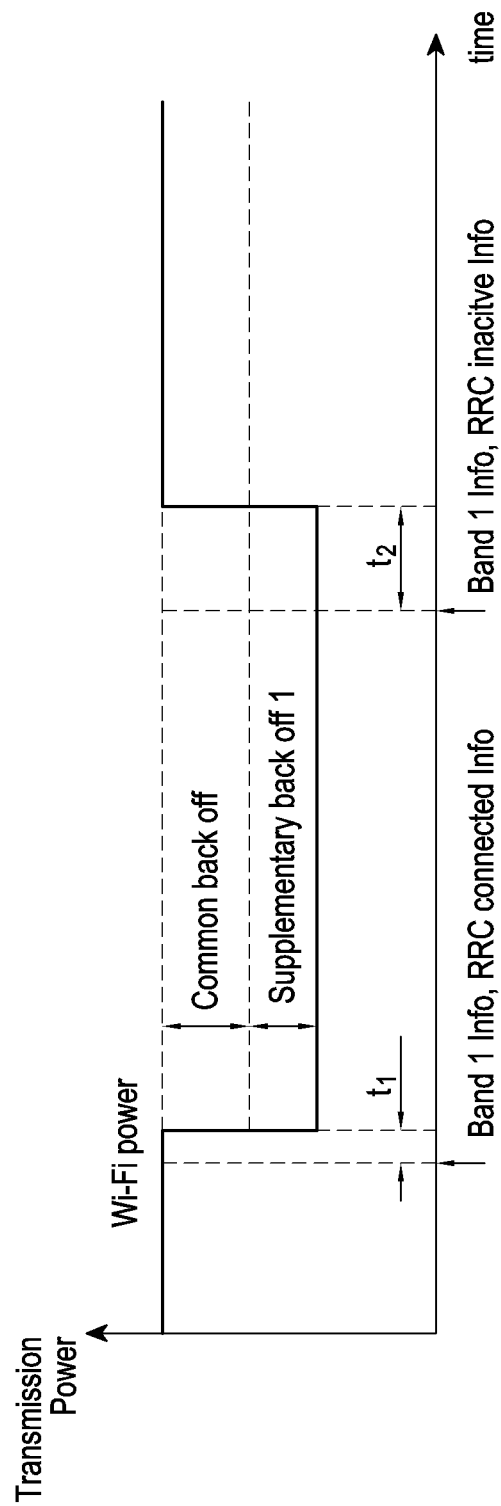
FIG. 19B is a view illustrating another example of an operation of backing off transmission power for Wi-Fi communication when an RRC state of an electronic device is changed according to an embodiment of the disclosure.

FIG. 17 is a view illustrating an operation of identifying a back-off value for each NR frequency band and each RRC state of another electronic device 400 according to an embodiment of the disclosure. FIG. 18A is a view illustrating an example of an operation of backing off transmission power for Wi-Fi communication according to an RRC state of an electronic device 400 according to an embodiment of the disclosure. FIG. 18B is a view illustrating an example of an operation of backing off transmission power for Wi-Fi communication when an RRC state of an electronic device 400 is changed according to an embodiment of the disclosure. FIG. 19A is a view illustrating another example of an operation of backing off transmission power for Wi-Fi communication according to an RRC state of an electronic device 400 according to an embodiment of the disclosure. FIG. 19B is a view illustrating another example of an operation of backing off transmission power for Wi-Fi communication when an RRC state of an electronic device 400 is changed according to an embodiment of the disclosure.

According to various embodiments, the electronic device 400 (e.g., the second processor 570 of FIG. 5) may provide first data to the first processor 530 in operation 1601 and provide second data to the second communication circuit 550 in operation 1603. For example, in the case of using a multiple radio access technology using NR access technology and Wi-Fi communication, the electronic device 400 (e.g., the processor 401) may transfer first data to the first processor 530 (e.g., the NR communication processor 402 of FIG. 4) and second data to the second communication circuit 550 (e.g., the processor (not shown) of the Wi-Fi communication module 403 of FIG. 4). The first processor 530 (e.g., the NR communication processor 402 of FIG. 4) may select a specific NR frequency band and transmit the first signal, into which the first data is converted, through the third antenna corresponding to the selected NR frequency band. The second communication circuit 550 (e.g., the processor (not shown) of the Wi-Fi communication module 403 of FIG. 4) may select a specific Wi-Fi frequency band and transmit the second signal, into which the second data is converted, through the fourth antenna corresponding to the selected Wi-Fi frequency band. Operations 901 and 903 of the electronic device 400 may be performed like operations 701 and 703 of the electronic device 400 as described above, and no duplicate description thereof is given below.

According to various embodiments, the electronic device 400 (e.g., the second processor 570 of FIG. 5) may obtain first information indicating the first frequency band and second information about the communication state from the first processor 530 in operation 1605. For example, the second processor 570 (e.g., the second processor 570 of FIG. 5) may receive communication-associated information from the first processor 530 (e.g., the NR communication processor 402 of FIG. 4). The communication-associated information may include information 1701 about the used NR frequency band and the communication connection state (e.g., RRC connected, RRC idle, and/or RRC inactive) 1703. Without limited to those described, the communication-associated information may include identification information about the used antenna, instead of the information 1701 about the NR frequency band. Since the transfer of the communication-associated information may be performed through the RIL described with reference to FIGS. 5 to 6, a redundant description will be omitted.

According to various embodiments, the electronic device 400 (e.g., the second processor 570 of FIG. 5) may transfer the first information and the second information to the second communication circuit 550 for the second communication circuit 550 to control the power for transmission of the second data through the second frequency band in operation 1607. For example, in response to receiving the first information associated with communication and the second information about the communication state (e.g., RRC state) from the first processor 530 (e.g., the NR communication processor 402 of FIG. 4), the electronic device 400 (e.g., the information transfer module 573 of the processor 401) may transfer the received first information and second information to the second communication circuit 550 (e.g., the processor (not shown) of the Wi-Fi communication module 403 of FIG. 4). Since the transfer of the information may be performed through the Wi-Fi manager 621 described with reference to FIGS. 5 and 6, a redundant description will be omitted. Referring to FIG. 17, the memory 560, which may be referred to by the second communication circuit 550 (e.g., the processor (not shown) of the Wi-Fi communication module 403 of FIG. 4), may previously store a designated back-off value (i.e., a common back off value) 1710 and per-NR frequency band back-off values 1720. As the back-off values 1720, different values 1721a, 1721b, 1723a, and 1723b may be stored for the RRC connected state and the RRC inactive state. For example, first back-off values 1721a and 1721b corresponding to a specific NR frequency band and second back-off values 1723a and 1723b smaller than the first back-off values 1721a and 1721b may be stored in the memory 560. The first back-off values 1721a and 1723a may correspond to the RRC connected state, and the second back-off values 1721b and 1723b may correspond to the RRC inactive state. Or, without limited to those described, if the RRC inactive state is identified, the processor 401 may refrain from the operation of backing off the transmission power for Wi-Fi communication (or maintain the original magnitude of transmission power). In this case, as described above, as the back-off values associated with the RRC state, different values may be stored depending on the Wi-Fi communication schemes (e.g., 2G Wi-Fi, 5G Wi-Fi, 2G real simultaneous dual band (rsdb) Wi-Fi, 5G rsdb Wi-Fi schemes). In an embodiment, if information 1701 (e.g., Band 1 info) about the NR frequency band and information 1703 about the RRC state is received, the second communication circuit 550 (e.g., the processor (not shown) of the Wi-Fi communication module 403 of FIG. 4) may identify the back-off value corresponding to the RRC state (e.g., RRC connected or RRC inactive) among the back-off values 1720 corresponding to the NR frequency band (e.g., Band 1 info), along with the designated back-off value 1710 (e.g., RRC connected info or RRC inactive info) by referring to the memory 560 and reduce the upper limit of transmission power by a value resultant from adding the back-off values 1710 and 1720 (e.g., a value obtained by adding the designated back-off value and the identified back-off value corresponding to the RRC state). Referring to 1801 of FIG. 18A, the second communication circuit 550 (e.g., the processor (not shown) of the Wi-Fi communication module 403 of FIG. 4) may reduce the upper limit of transmission power of the second signal by a first value (common back off+supplementary back off 1) based on receiving the information (RRC connected info) indicating RRC connected and the information (Band 1 info) about the first frequency band and, referring to 1802 of FIG. 18A, the second communication circuit 550 (e.g., the processor (not shown) of the Wi-Fi communication module 403 of FIG. 4) may reduce the upper limit of transmission power of the second signal by a second value (common back off+supplementary back off 2) smaller than the first value based on receiving the information (RRC inactive info) indicating RRC inactive and the information about the first frequency band (Band 1 info). In other words, in the RRC inactive state, the back-off value may be adjusted to be relatively small, so that Wi-Fi communication may be performed smoothly. Further, without limited to those described and/or shown, no additional back-off is performed in the RRC inactive state while only a back-off operation based on a designated back-off value may be performed.

Referring to FIG. 18B, according to various embodiments, when the RRC state is changed to the RRC inactive state, the electronic device 400 may change the value of the transmission power backed off for Wi-Fi communication a designated time after the changed time. For example, if the RRC state is changed to the inactive state while reducing the upper limit of transmission power by the first value in the active state of the RRC state, the electronic device 400 (e.g., the Wi-Fi communication module 403) may maintain the upper limit of transmission power, reduced by the first value, during a designated time t2 from the changed time and, after the designated time t2, reduce the upper limit of transmission power by the second value. The designated time t2 may be longer than the designated time t1 when the RRC state is changed to the connected state. As an example, the processor 401 may receive communication-associated information and, if identifying that the RRC state is to be changed to the RRC inactive state based on the received information, execute a timer from the identified time and determine whether a designated time t2 elapses, and after the designated time t2 elapses, transmit communication-associated information to the Wi-Fi communication module 403. As another example, the Wi-Fi communication module 403 may receive communication-associated information and, if identifying that the RRC state is to be changed to the RRC inactive state, perform a back-off operation according to the changed RRC inactive state the designated time t2 after the identified time.

Referring to 1901 and 1902 of FIG. 19A, further, without limited to those described and/or shown, as described above, the second communication circuit 550 (e.g., the processor (not shown) of the Wi-Fi communication module 403 of FIG. 4) may receive information about the NR frequency band and information about the RRC state, if the RRC state is identified as the RRC connected state based on the received information, perform the operation of backing off the transmission power for Wi-Fi communication and, if the RRC state is the RRC inactive state, may not perform the operation of backing off the transmission power. Referring to FIG. 19B, further, if the RRC state is changed to the RRC inactive state, the second communication circuit 550 (e.g., the processor (not shown) of the Wi-Fi communication module 403 of FIG. 4) may maintain the back-off operation during the designated time t2 from the changed time and stop the back-off operation after the designated time t2.

According to various embodiments, there may be provided an electronic device (e.g., the electronic device 400 of FIG. 4) comprising a first communication circuit (e.g., the first communication circuit 540 of FIG. 5) supporting a first RAT, a first processor (e.g., the NR communication processor 402 of FIG. 4) operatively connected with the first communication circuit (e.g., the first communication circuit 540 of FIG. 5), a second communication circuit (e.g., the Wi-Fi communication module 403 of FIG. 4) supporting a second RAT, and a second processor (e.g., the processor 401 of FIG. 4) electrically connected with the first processor (e.g., the NR communication processor 402 of FIG. 4) and the second communication circuit (e.g., the Wi-Fi communication module 403 of FIG. 4), wherein the second processor (e.g., the processor 401 of FIG. 4) is configured to provide first data to the first processor (e.g., the NR communication processor 402 of FIG. 4), wherein a first signal, corresponding to the first data based on the first RAT, is transmitted through a first frequency band using the first processor (e.g., the NR communication processor 402 of FIG. 4) and the first communication circuit (e.g., the first communication circuit 540 of FIG. 5), provide second data to the second communication circuit (e.g., the Wi-Fi communication module 403 of FIG. 4), wherein a second signal corresponding to the second data based on the second RAT, is transmitted through a second frequency band using the second communication circuit (e.g., the Wi-Fi communication module 403 of FIG. 4), obtain first information indicating the first frequency band from the first processor (e.g., the NR communication processor 402 of FIG. 4), and transfer the first information to the second communication circuit (e.g., the Wi-Fi communication module 403 of FIG. 4) for the second communication circuit (e.g., the Wi-Fi communication module 403 of FIG. 4) to control an upper limit of transmission power of the second signal through the second frequency band into a magnitude associated with the first frequency band.

According to various embodiments, there may be provided the electronic device (e.g., the electronic device 400 of FIG. 4), wherein the first processor (e.g., the NR communication processor 402 of FIG. 4) is an NR communication processor, and the second communication circuit (e.g., the Wi-Fi communication module 403 of FIG. 4) is a Wi-Fi communication circuit, and wherein the second processor (e.g., the processor 401 of FIG. 4) is configured to receive the first information from the first processor (e.g., the NR communication processor 402 of FIG. 4) using a radio interface layer (RIL), and transfer the first information to the second communication circuit (e.g., the Wi-Fi communication module 403 of FIG. 4) using a Wi-Fi manager.

According to various embodiments, there may be provided the electronic device (e.g., the electronic device 400 of FIG. 4) further comprising a memory (e.g., the memory 560 of FIG. 5) connected to the second communication circuit (e.g., the Wi-Fi communication module 403 of FIG. 4), the second communication circuit (e.g., the Wi-Fi communication module 403 of FIG. 4) is configured to identify a first back-off value corresponding to the first information, based on the first information and information about a back-off value for each of a plurality of frequency bands stored in the memory (e.g., the memory 560 of FIG. 5), and control the upper limit of transmission power of the second signal through the second frequency band into the magnitude associated with the first frequency band based on the first back-off value.

According to various embodiments, there may be provided the electronic device (e.g., the electronic device 400 of FIG. 4) further comprising a plurality of first antennas operatively connected with the first communication circuit (e.g., the first communication circuit 540 of FIG. 5), and a plurality of second antennas operatively connected with the second communication circuit (e.g., the Wi-Fi communication module 403 of FIG. 4), wherein the first processor (e.g., the NR communication processor 402 of FIG. 4) is configured to transmit the first signal using a third antenna corresponding to the first frequency band among the plurality of first antennas, using the first communication circuit (e.g., the first communication circuit 540 of FIG. 5), wherein the second communication circuit (e.g., the Wi-Fi communication module 403 of FIG. 4) is configured to transmit the second signal using a fourth antenna corresponding to the second frequency band among the plurality of second antennas, and wherein the third antenna and the fourth antenna are positioned within a designated distance.

According to various embodiments, there may be provided the electronic device (e.g., the electronic device 400 of FIG. 4), wherein the plurality of frequencies whose back-off values are stored in the memory (e.g., the memory 560 of FIG. 5) are associated with antennas positioned within the designated distance from at least some of the plurality of second antennas among the plurality of first antennas.

According to various embodiments, there may be provided the electronic device (e.g., the electronic device 400 of FIG. 4), wherein the designated distance is associated with an SPLS ratio of the third antenna and the fourth antenna.

According to various embodiments, there may be provided the electronic device (e.g., the electronic device 400 of FIG. 4), wherein the second communication circuit (e.g., the Wi-Fi communication module 403 of FIG. 4) is configured to transmit the second signal using the fourth antenna through the second frequency band, based on a first communication scheme among a plurality of communication schemes associated with the second RAT, and identify the first back-off value corresponding to the first information and the first communication scheme stored in the memory (e.g., the memory 560 of FIG. 5).

According to various embodiments, there may be provided the electronic device (e.g., the electronic device 400 of FIG. 4), wherein the second processor (e.g., the processor 401 of FIG. 4) is configured to receive the first information from the first processor (e.g., the NR communication processor 402 of FIG. 4) when communication based on the first RAT and the second RAT is performed.

According to various embodiments, there may be provided the electronic device (e.g., the electronic device 400 of FIG. 4), wherein the first processor (e.g., the NR communication processor 402 of FIG. 4) is configured to when call data based on the first RAT is received through the first communication circuit (e.g., the first communication circuit 540 of FIG. 5) from a network while the second data is provided to the second communication circuit (e.g., the Wi-Fi communication module 403 of FIG. 4), identify the first information indicating the first frequency band and transfer the identified first information to the second processor (e.g., the processor 401 of FIG. 4).

According to various embodiments, there may be provided the electronic device (e.g., the electronic device 400 of FIG. 4), wherein the second processor (e.g., the processor 401 of FIG. 4) is configured to, when the performing of the communication based on the first RAT and the second RAT is terminated, receive second information indicating the termination of the performing of the communication from the first processor (e.g., the NR communication processor 402 of FIG. 4), and transfer the second information to the second communication circuit (e.g., the Wi-Fi communication module 403 of FIG. 4) to allow the second communication circuit (e.g., the Wi-Fi communication module 403 of FIG. 4) to increase the upper limit of transmission power of the second signal through the second frequency band.

According to various embodiments, there may be provided the electronic device (e.g., the electronic device 400 of FIG. 4), wherein the first processor (e.g., the NR communication processor 402 of FIG. 4) is configured to transfer second information to the second processor (e.g., the processor 401 of FIG. 4) when call data based on the first RAT is received and then the reception of the call data is stopped.

According to various embodiments, there may be provided the electronic device (e.g., the electronic device 400 of FIG. 4), wherein the second processor (e.g., the processor 401 of FIG. 4) is configured to receive second information indicating a third frequency band from the first processor (e.g., the NR communication processor 402 of FIG. 4) when information associated with first communication based on the first RAT is changed while the communication based on the first RAT and the second RAT is performed, and transfer the second information to the second communication circuit (e.g., the Wi-Fi communication module 403 of FIG. 4) for the second communication circuit (e.g., the Wi-Fi communication module 403 of FIG. 4) to control the upper limit of transmission power of the second signal through the second frequency band into a magnitude associated with the third frequency band.

According to various embodiments, there may be provided the electronic device (e.g., the electronic device 400 of FIG. 4), wherein the first RAT is a new radio (NR) radio access technology, and wherein the second processor (e.g., the processor 401 of FIG. 4) is configured to receive the first information from the first processor (e.g., the NR communication processor 402 of FIG. 4) when an RRC state of the electronic device (e.g., the electronic device 400 of FIG. 4) is changed to an RRC connected state.

According to various embodiments, there may be provided the electronic device (e.g., the electronic device 400 of FIG. 4), wherein the first RAT is an NR radio access technology, and wherein the second processor (e.g., the processor 401 of FIG. 4) is configured to receive the first information from the first processor (e.g., the NR communication processor 402 of FIG. 4) when an RRC state of the electronic device (e.g., the electronic device 400 of FIG. 4) is an RRC idle state, and a response signal is received from a network using the first processor (e.g., the NR communication processor 402 of FIG. 4) and the first communication circuit (e.g., the first communication circuit 540 of FIG. 5).

According to various embodiments, there may be provided the electronic device (e.g., the electronic device 400 of FIG. 4), wherein the first RAT is a new radio (NR) radio access technology, and wherein the second processor (e.g., the processor 401 of FIG. 4) is configured to receive second information indicating an RRC state, along with the first information, from the first processor (e.g., the NR communication processor 402 of FIG. 4), and transfer the first information and the second information to the second communication circuit (e.g., the Wi-Fi communication module 403 of FIG. 4) for the second communication circuit (e.g., the Wi-Fi communication module 403 of FIG. 4) to control the upper limit of transmission power of the second signal through the second frequency band.

According to various embodiments, there may be provided the electronic device (e.g., the electronic device 400 of FIG. 4), wherein the second communication circuit (e.g., the Wi-Fi communication module 403 of FIG. 4) is configured to, when the second information corresponds to an RRC connected state, control the upper limit of transmission power of the second signal into a first value, and when the second information corresponds to an RRC inactive state, control the upper limit of transmission power of the second signal into a second value smaller than the first value.

According to various embodiments, there may be provided a method for operating an electronic device (e.g., the electronic device 400 of FIG. 4) comprising providing first data to a first processor (e.g., the NR communication processor 402 of FIG. 4) operatively connected with a first communication circuit (e.g., the first communication circuit 540 of FIG. 5) supporting a first RAT (NR), using a second processor (e.g., the processor 401 of FIG. 4), wherein a first signal, corresponding to the first data based on the first RAT, is transmitted through a first frequency band using the first processor (e.g., the NR communication processor 402 of FIG. 4) and the first communication circuit (e.g., the first communication circuit 540 of FIG. 5), providing second data to a second communication circuit (e.g., the Wi-Fi communication module 403 of FIG. 4) supporting a second RAT, using the second processor (e.g., the processor 401 of FIG. 4), wherein a second signal, corresponding to the second data based on the second RAT, is transmitted through a second frequency band using the second communication circuit (e.g., the Wi-Fi communication module 403 of FIG. 4), obtaining first information indicating the first frequency band from the first processor (e.g., the NR communication processor 402 of FIG. 4), using the second processor (e.g., the processor 401 of FIG. 4), and transferring the first information to the second communication circuit (e.g., the Wi-Fi communication module 403 of FIG. 4), using the second processor (e.g., the processor 401 of FIG. 4), for the second communication circuit (e.g., the Wi-Fi communication module 403 of FIG. 4) to control an upper limit of transmission power of the second signal through the second frequency band into a magnitude associated with the first frequency band.

According to various embodiments, there may be provided the method, wherein the first processor (e.g., the NR communication processor 402 of FIG. 4) is an NR communication processor, and the second communication circuit (e.g., the Wi-Fi communication module 403 of FIG. 4) is a Wi-Fi communication circuit, and wherein the method further comprises receiving the first information from the first processor (e.g., the NR communication processor 402 of FIG. 4) using a radio interface layer (RIL) of the second processor (e.g., the processor 401 of FIG. 4), and transferring the first information to the second communication circuit (e.g., the Wi-Fi communication module 403 of FIG. 4) using a Wi-Fi manager of the second processor (e.g., the processor 401 of FIG. 4).

According to various embodiments, there may be provided an electronic device (e.g., the electronic device 400 of FIG. 4) comprising a first communication circuit (e.g., the first communication circuit 540 of FIG. 5) supporting a first RAT (NR), a plurality of first antennas operatively connected with the first communication circuit (e.g., the first communication circuit 540 of FIG. 5), a first processor (e.g., the NR communication processor 402 of FIG. 4) operatively connected with the first communication circuit (e.g., the first communication circuit 540 of FIG. 5), a second communication circuit (e.g., the Wi-Fi communication module 403 of FIG. 4) supporting a second RAT (Wi-Fi), a plurality of second antennas operatively connected with the second communication circuit (e.g., the Wi-Fi communication module 403 of FIG. 4), and a second processor (e.g., the processor 401 of FIG. 4) electrically connected with the first processor (e.g., the NR communication processor 402 of FIG. 4) and the second communication circuit (e.g., the Wi-Fi communication module 403 of FIG. 4), wherein the second processor (e.g., the processor 401 of FIG. 4) is configured to provide first data to the first processor (e.g., the NR communication processor 402 of FIG. 4), wherein a first signal, corresponding to the first data based on the first RAT, is transmitted through a third antenna among the plurality of first antennas using the first processor (e.g., the NR communication processor 402 of FIG. 4) and the first communication circuit (e.g., the first communication circuit 540 of FIG. 5), provide second data to the second communication circuit (e.g., the Wi-Fi communication module 403 of FIG. 4), wherein a second signal, corresponding to the second data based on the second RAT, is transmitted through a fourth antenna among the plurality of second antennas using the second communication circuit (e.g., the Wi-Fi communication module 403 of FIG. 4), a position of the third antenna and a position of the fourth antenna meeting a designated condition, obtain first information indicating a first frequency band associated with the third antenna from the first processor (e.g., the NR communication processor 402 of FIG. 4), and transfer the first information to the second communication circuit (e.g., the Wi-Fi communication module 403 of FIG. 4) for the second communication circuit (e.g., the Wi-Fi communication module 403 of FIG. 4) to control an upper limit of transmission power of the second signal through the second frequency band into a magnitude associated with the first frequency band.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a first communication circuit supporting a first radio access technology (RAT);
a first processor operatively connected with the first communication circuit;
a second communication circuit supporting a second RAT; and
a second processor electrically connected with the first processor and the second communication circuit,
wherein the second processor is configured to:
provide first data to the first processor, wherein a first signal, corresponding to the first data based on the first RAT, is transmitted through a first frequency band using the first processor and the first communication circuit,
provide second data to the second communication circuit, wherein a second signal, corresponding to the second data based on the second RAT, is transmitted through a second frequency band using the second communication circuit,
obtain first information indicating the first frequency band from the first processor, and transmit the first information to the second communication circuit for the second communication circuit to control an upper limit of transmission power of the second signal through the second frequency band into a magnitude associated with the first frequency band.

2. The electronic device of claim 1,
wherein the first processor is a new radio (NR) communication processor, and
the second communication circuit is a Wi-Fi communication circuit, and
wherein the second processor is configured to:
receive the first information from the first processor using a radio interface layer (RIL), and
transmit the first information to the second communication circuit using a Wi-Fi manager.

3. The electronic device of claim 1, further comprising:
a memory connected to the second communication circuit,
wherein the second communication circuit is configured to:
identify a first back-off value corresponding to the first information, based on the first information and information about a back-off value for each of a plurality of frequency bands stored in the memory, and
control the upper limit of transmission power of the second signal through the second frequency band into the magnitude associated with the first frequency band based on the first back-off value.

4. The electronic device of claim 3, further comprising:
a plurality of first antennas operatively connected with the first communication circuit; and
a plurality of second antennas operatively connected with the second communication circuit;
wherein the first processor is configured to transmit the first signal using a third antenna corresponding to the first frequency band among the plurality of first antennas, using the first communication circuit,
wherein the second communication circuit is further configured to transmit the second signal using a fourth antenna corresponding to the second frequency band among the plurality of second antennas, and
wherein the third antenna and the fourth antenna are positioned within a designated distance of each other.

5. The electronic device of claim 4, wherein a plurality of frequencies whose back-off values are stored in the memory, are associated with antennas positioned within the designated distance from at least one of the plurality of second antennas among the plurality of first antennas.

6. The electronic device of claim 5, wherein the designated distance is associated with a specific absorption rate (SAR) peak to location (SPLS) ratio of the third antenna and the fourth antenna.

7. The electronic device of claim 4, wherein the second communication circuit is further configured to:
transmit the second signal using the fourth antenna through the second frequency band, based on a first communication scheme among a plurality of communication schemes associated with the second RAT, and
identify the first back-off value corresponding to the first information and the first communication scheme stored in the memory.

8. The electronic device of claim 1,
wherein the first RAT is a new radio (NR) radio access technology, and
wherein the second RAT is Wi-Fi communication connection.

9. The electronic device of claim 1, wherein the second processor is further configured to receive the first information from the first processor when communication based on the first RAT and the second RAT is performed.

10. The electronic device of claim 9, wherein the first processor is configured to:
when call data based on the first RAT is received through the first communication circuit from a network while the second data is provided to the second communication circuit, identify the first information indicating the first frequency band, and
transmit the identified first information to the second processor.

11. The electronic device of claim 9, wherein the second processor is configured to:
when performing of the communication based on the first RAT and the second RAT is terminated, receive second information, indicating the termination of the performing of the communication, from the first processor, and
transmit the second information to the second communication circuit for the second communication circuit to increase the upper limit of transmission power of the second signal through the second frequency band.

12. The electronic device of claim 11, wherein the first processor is configured to:
transmit second information to the second processor when call data based on the first RAT is received and then the reception of the call data is stopped.

13. The electronic device of claim 9, wherein the second processor is further configured to:
receive second information, indicating a third frequency band, from the first processor when information associated with first communication based on the first RAT is changed while the communication based on the first RAT and the second RAT is performed, and
transmit the second information to the second communication circuit for the second communication circuit to control the upper limit of transmission power of the second signal through the second frequency band into a magnitude associated with the third frequency band.

14. The electronic device of claim 1,
wherein the first RAT is a new radio (NR) radio access technology, and
wherein the second processor is configured to:
receive the first information from the first processor when a radio resource control (RRC) state of the electronic device is changed to an RRC connected state.

15. The electronic device of claim 1,
wherein the first RAT is a new radio (NR) radio access technology, and
wherein the second processor is further configured to receive the first information from the first processor when a radio resource control (RRC) state of the electronic device is an RRC idle state and a response signal is received from a network using the first processor and the first communication circuit.

16. The electronic device of claim 1,
wherein the first RAT is a new radio (NR) radio access technology, and
wherein the second processor is further configured to:
receive second information indicating a radio resource control (RRC) state, along with the first information, from the first processor, and
transmit the first information and the second information to the second communication circuit for the second communication circuit to control the upper limit of transmission power of the second signal through the second frequency band.

17. The electronic device of claim 16, wherein the second communication circuit is configured to:
when the second information corresponds to an RRC connected state, control the upper limit of transmission power of the second signal into a first value, and
when the second information corresponds to an RRC inactive state, control the upper limit of transmission power of the second signal into a second value smaller than the first value.

18. A method for operating an electronic device, the method comprising:
providing first data to a first processor operatively connected with a first communication circuit supporting a first radio access technology (RAT), using a second processor, wherein a first signal, corresponding to the first data based on the first RAT, is transmitted through a first frequency band using the first processor and the first communication circuit;
providing second data to a second communication circuit supporting a second RAT, using the second processor, wherein a second signal, corresponding to the second data based on the second RAT, is transmitted through a second frequency band using the second communication circuit;
obtaining first information indicating the first frequency band from the first processor, using the second processor; and
transmitting the first information to the second communication circuit, using the second processor, for the second communication circuit to control an upper limit of transmission power of the second signal through the second frequency band into a magnitude associated with the first frequency band.

19. The method of claim 18,
wherein the first processor is a new radio (NR) communication processor,
wherein the second communication circuit is a Wi-Fi communication circuit, and
wherein the method further comprises:
receiving the first information from the first processor using a radio interface layer (RIL) of the second processor, and
transferring the first information to the second communication circuit using a Wi-Fi manager of the second processor.

20. An electronic device comprising:
a first communication circuit supporting a first radio access technology (RAT);
a plurality of first antennas operatively connected with the first communication circuit;
a first processor operatively connected with the first communication circuit;
a second communication circuit supporting a second RAT;
a plurality of second antennas operatively connected with the second communication circuit; and
a second processor electrically connected with the first processor and the second communication circuit;
wherein the second processor is configured to:
provide first data to the first processor, wherein a first signal, corresponding to the first data based on the first RAT, is transmitted through a third antenna among the plurality of first antennas using the first processor and the first communication circuit,
provide second data to the second communication circuit, wherein a second signal, corresponding to the second data based on the second RAT, is transmitted through a fourth antenna among the plurality of second antennas using the second communication circuit, a position of the third antenna and a position of the fourth antenna meeting a designated condition,
obtain first information indicating a first frequency band associated with the third antenna from the first processor, and
transmit the first information to the second communication circuit for the second communication circuit to control an upper limit of transmission power of the second signal through a second frequency band into a magnitude associated with the first frequency band.

* * * * *